United States Patent
Ezaki et al.

(10) Patent No.: US 11,542,402 B2
(45) Date of Patent: Jan. 3, 2023

(54) OIL-BASED INKJET INK, METHOD FOR PRODUCING OIL-BASED INKJET INK AND METHOD FOR PRODUCING DISPERSANT

(71) Applicant: RISO KAGAKU CORPORATION, Tokyo (JP)

(72) Inventors: Naofumi Ezaki, Ibaraki (JP); Shinichiro Shimura, Ibaraki (JP); Shinsuke Ozawa, Ibaraki (JP); Tsukasa Hamada, Ibaraki (JP); Mitsuko Kitanohara, Ibaraki (JP); Tetsuya Shiraishi, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 375 days.

(21) Appl. No.: 16/717,805

(22) Filed: Dec. 17, 2019

(65) Prior Publication Data
US 2020/0239719 A1    Jul. 30, 2020

(30) Foreign Application Priority Data
Jan. 30, 2019    (JP) .............................. JP2019-014356

(51) Int. Cl.
| C09D 11/36  | (2014.01) |
| C09D 11/033 | (2014.01) |
| C09D 11/037 | (2014.01) |
| C09D 11/102 | (2014.01) |
| C09D 11/107 | (2014.01) |
| C09D 11/322 | (2014.01) |
| C09D 11/38  | (2014.01) |

(52) U.S. Cl.
CPC ............ *C09D 11/36* (2013.01); *C09D 11/033* (2013.01); *C09D 11/037* (2013.01); *C09D 11/102* (2013.01); *C09D 11/107* (2013.01); *C09D 11/322* (2013.01); *C09D 11/38* (2013.01)

(58) Field of Classification Search
CPC ......... C09D 11/36; C09D 11/38; C09D 11/102
See application file for complete search history.

(56) References Cited

U.S. PATENT DOCUMENTS

| 6,852,777 | B1 | 2/2005  | Nakano et al. |
| 8,251,503 | B2 | 8/2012  | Kawashima |
| 8,278,371 | B2 | 10/2012 | Shiotani et al. |
| 9,963,603 | B2 | 5/2018  | Watanabe et al. |
| 10,144,839 | B2 | 12/2018 | Shimizu et al. |
| 10,590,295 | B2 | 3/2020  | Grouchko et al. |
| 10,591,839 | B2 | 3/2020  | Bar-Haim et al. |
| 2013/0190421 | A1 | 7/2013 | King et al. |
| 2015/0197648 | A1 | 7/2015 | Watanabe et al. |
| 2015/0197650 | A1 | 7/2015 | Watanabe et al. |

FOREIGN PATENT DOCUMENTS

| CN | 1296519 | 5/2001 |
| CN | 102027078 | 4/2011 |
| CN | 101400750 B | 11/2011 |
| CN | 104284952 | 1/2015 |
| CN | 104789048 | 7/2015 |
| CN | 109071978 | 12/2018 |
| CN | 107868489 B | 7/2019 |
| EP | 2896665 | 7/2015 |
| EP | 3118269 | 1/2017 |
| JP | 2005023099 A * | 1/2005 |
| JP | 2005-054141 | 3/2005 |
| JP | 2008-247967 | 10/2008 |
| JP | 2010-215700 | 9/2010 |
| JP | 2014-051635 | 3/2014 |
| JP | 2015-124375 | 7/2015 |
| JP | 2015-134850 | 7/2015 |
| JP | 2015-134852 | 7/2015 |
| JP | 2016-160419 | 9/2016 |
| JP | 2017-019998 | 1/2017 |
| JP | 2018-053129 | 4/2018 |
| WO | 2014/136355 | 9/2014 |

OTHER PUBLICATIONS

Machine translation of JP-2005023099-A (Year: 2005).*
Office Action issued for Chinese Patent Application No. 201911355732. 1, dated Dec. 17, 2021, 10 pages.
The extended European Search Report issued for European Patent Application No. 19217067.8, dated Jun. 19, 2020, 5 pages.
Office Action issued for Chinese Patent Application No. 201911355732. 1, dated May 31, 2022, 16 pages including machine translation.
Office Action issued for Japanese Patent Application No. 2019-014356, dated Aug. 2, 2022, 6 pages including machine translation.
Qingxi Yu, "Manual For Rubber Raw Materials," Chemical Industry Press, Jan. 31, 1996, p. 530; partial English translation provided.
Office Action issued for Chinese Patent Application No. 201911355732. 1, dated Sep. 14, 2022, 6 pages.

* cited by examiner

*Primary Examiner* — Wenwen Cai
(74) *Attorney, Agent, or Firm* — Hamre, Schumann, Mueller & Larson, P.C.

(57) ABSTRACT

An oil-based inkjet ink is disclosed that contains a pigment, a dispersant formed with an acidic resin, a low-molecular weight amine compound and a basic polymer, and a non-aqueous solvent. A method for producing an oil-based inkjet ink and a method for producing a dispersant is also disclosed.

10 Claims, No Drawings

OIL-BASED INKJET INK, METHOD FOR PRODUCING OIL-BASED INKJET INK AND METHOD FOR PRODUCING DISPERSANT

CROSS REFERENCE TO RELATED APPLICATIONS

This application is based upon and claims the benefit of priority from the prior Japanese Patent Application No. 2019-014356, filed on Jan. 30, 2019, the entire contents of which are incorporated by reference herein.

BACKGROUND OF THE INVENTION

Field of the Invention

Embodiments of the present invention relate to an oil-based inkjet ink, a method for producing an oil-based inkjet ink, and a method for producing a dispersant.

Description of the Related Art

The inkjet recording method is a method in which an inkjet ink of high fluidity is jetted from fine nozzles in the form of liquid droplets, thereby recording an image on a recording medium positioned facing the nozzles, and because this method enables high-speed printing to be conducted with little noise, it has rapidly become widespread in recent years. Examples of known types of inks that can be used in this type of inkjet recording method include aqueous inks which contain water as the main solvent, ultraviolet-curable inks (UV inks) which contain a large amount of a polymerizable monomer as the main component, hot melt inks (solid inks) which contain a large amount of a wax as the main component, and so-called non-aqueous inks which contain a non-aqueous solvent as the main solvent. Non-aqueous inks can be classified into solvent-based inks in which the main solvent is a volatile organic solvent, and oil-based inks in which the main solvent is an organic solvent having either low volatility or no volatility. Solvent-based inks mainly dry on the recording medium as a result of evaporation of the organic solvent, whereas oil-based inks mainly dry as a result of penetration into the recording medium.

JP 2015-134850 A discloses a colored resin particle dispersion containing colored resin particles that contain a phosphorylated solid resin and/or a nitrated solid resin, and an inkjet ink containing the colored resin particle dispersion.

JP 2015-134852 A discloses a colored resin particle dispersion containing colored resin particles that contain a solid resin and a liquid organic compound having an acidic group, and an inkjet ink containing the colored resin particle dispersion.

SUMMARY OF THE INVENTION

An embodiment of the present invention relates to an oil-based inkjet ink containing a pigment, a dispersant formed with an acidic resin, a low-molecular weight amine compound and a basic polymer, and a non-aqueous solvent.

Another embodiment of the present invention relates to a method for producing an oil-based inkjet ink, the method including obtaining a water-in-oil emulsion containing a continuous phase that contains a non-aqueous solvent and a basic polymer, and a dispersed phase that contains water, an acidic water-dispersible resin and a low-molecular weight amine compound; removing water from the water-in-oil emulsion to obtain a dispersant dispersion; and mixing the dispersant dispersion and a pigment, and dispersing the pigment.

Another embodiment of the present invention relates to a method for producing a dispersant, the method including obtaining a water-in-oil emulsion containing a continuous phase that contains a non-aqueous solvent and a basic polymer, and a dispersed phase that contains water, an acidic water-dispersible resin and a low-molecular weight amine compound; and removing water from the water-in-oil emulsion.

DETAILED DESCRIPTION OF THE EMBODIMENTS

Embodiments of the present invention are described below, but the following embodiments in no way limit the present invention. In the following description, an oil-based inkjet ink is sometimes referred to as simply an "ink" or an "oil-based ink".

When inks are exposed to external forces, such as when the ink in an ink pathway is subjected to sliding under the action of a feed pump, aggregates may sometimes form.

An oil-based inkjet ink of one embodiment of the present invention is an oil-based inkjet ink containing a pigment, a dispersant formed with an acidic resin, a low-molecular weight amine compound and a basic polymer (hereafter sometimes referred to as simply "the dispersant"), and a non-aqueous solvent.

In an ink, in a case in which a compound having a free acidic group exists in the vicinity of the pigment, then the cohesive force of the pigment may tend to increase, and if this type of ink is exposed to an external force such as sliding, then aggregates may tend to form more readily. According to the present embodiment in which a dispersant formed with an acidic resin, a low-molecular weight amine compound and a basic polymer is used, it is possible to obtain an ink in which aggregates are less likely to form even upon exposure to external forces such as sliding. Although not constrained by any particular theory, the reason for this effect is thought as follows. It is thought that in this dispersant, the low-molecular weight amine compound may bond to an acidic group of the acidic resin and a basic group of the basic polymer may bond to an acidic group of the acidic resin, whereby the amount of free acidic groups may he reduced, and an ink in which pigment aggregation are less likely to form may be formed.

Although there are no particular limitations on the method used for producing the oil-based inkjet ink of the present embodiment, the ink may be produced, for example, by a method that employs water evaporation of a water-in-oil (W/O) emulsion as described below.

The oil-based inkjet ink may contain a pigment.

Examples pigments include organic pigments and inorganic pigments. Examples of organic pigments include azo pigments, phthalocyanine pigments, polycyclic pigments and dye lake pigments. Examples of inorganic pigment include carbon blacks and metal oxides.

Examples of the azo pigments include soluble azo lake pigments, insoluble azo pigments and condensed azo pigments. Examples of the phthalocyanine pigments include metal phthalocyanine pigments and metal-free phthalocyanine pigments. Examples of the polycyclic pigments include quinacridone-based pigments, perylene-based pigments, perinone-based pigments, isoindoline-based pigments, isoindolinone-based pigments, dioxazine-based pigments, thioindigo-based pigments, anthraquinone-based pigments, quinophthalone-based pigments, metal complex pigments and diketopyrrolopyrrole (DPP). Examples of the carbon blacks include furnace carbon black, lamp black, acetylene black and channel black. Examples of the metal oxides include titanium oxide and zinc oxide. One of these pigments may be used alone, or a combination of two or more pigments may be used.

From the viewpoint of enabling printed items of high saturation to be obtained, the cyan ink preferably contains copper phthalocyanine. The yellow ink preferably contains one of monoazo yellow, disazo yellow and benzimidazolone yellow, and more preferably contains disazo yellow. The magenta ink preferably contains one of azo lake red, naphthol AS, benzimidazolone red and quinacridone magenta, and more preferably contains azo lake red.

From the viewpoints of the jetting stability and the storage stability, the average particle size of the pigment is preferably not more than 300 nm, and more preferably 200 nm or less.

The amount of the pigment, relative to the total mass of the ink, is typically from 0.01 to 20% by mass, and from the viewpoints of the image density and the ink viscosity, is preferably from 1 to 15% by mass.

The oil-based inkjet ink may contain a dispersant formed with an acidic resin, a low-molecular weight amine compound and a basic polymer. This dispersant may be any dispersant formed using at least an acidic resin, a low-molecular weight amine compound and a basic polymer, and may be a dispersant formed using another component in addition to the acidic resin, the low-molecular weight amine compound and the basic polymer. This dispersant may be a dispersant containing a partial structure derived from an acidic resin, a partial structure derived from a low-molecular weight amine compound, and a partial structure derived from a basic polymer, and may be a dispersant further containing another partial structure in addition to these partial structures.

The dispersant is preferably used in the form of resin particles during the production process for the oil-based inkjet ink. For example, in the case where the dispersant is produced by a method that employs water evaporation of a water-in-oil (W/O) emulsion, the dispersant is preferably produced in the form of resin particles.

In the oil-based inkjet ink, the dispersant is preferably contained, together with the pigment, within colored resin particles. In these types of colored resin particles, the pigment may be, for example, coated with the dispersant.

There are no particular limitations on the acidic resin, and examples of acidic resins include acidic urethane resins, acidic polyester resins, acidic (meth)acrylic resins, acidic urethane-(meth)acrylic resins, acidic (meth)acrylic-silicone resins, acidic vinyl chloride resins, and acidic styrene-(meth)acrylic resins. From the viewpoint of improving the rub fastness, acidic urethane resins and acidic (meth)acrylic resins are preferred, and acidic urethane resins are more preferred.

Urethane resins have a urethane group. The urethane group of a urethane resin may be generally obtained by the reaction of a polyol and a polyisocyanate. From the viewpoint of the storage stability, the acidic urethane resin is preferably an acidic urethane resin in which an aliphatic polyisocyanate is used as the polyisocyanate.

From the viewpoint of improving the nib fastness, the acidic urethane resin is preferably an acidic urethane-urea resin having a urea group as well as a urethane group. Urethane-urea resins can be obtained, for example, by reacting a urethane prepolymer, obtained using materials including a polyol and a polyisocyanate, with water and/or a polyamine compound, thereby reacting the isocyanate groups of the urethane prepolymer with the water and/or polyamine compound to form a urea group and extend the chain.

Examples of acidic urethane resins also include acidic urethane-(meth)acrylic resins, but these resins are also included within examples of acidic (meth)acrylic resins.

The term "(meth)acrylic" means methacrylic, acrylic, or a combination thereof, and a (meth)acrylic resin means a resin containing a methacrylic unit, a resin containing an acrylic unit, or a resin containing a methacrylic unit and an acrylic unit.

The acidic resin may be, for example, a resin having an acidic group. An acidic water-dispersible resin, for example, may be used as a raw material in the ink production. The acidic resin is preferably a resin having an acidic group. The acidic group is preferably a carboxyl group, a sulfo group, or a phosphoric acid group or the like.

The acidic resin is preferably a resin for which, when the acidic resin is dissolved or dispersed in water, the oxidation-reduction potential (ORP value) increases as the concentration of the acidic resin increases. For example, when the acidic resin is dissolved or dispersed in a solvent capable of dissolving or dispersing the acidic resin, it is preferable that the ORP value when the acidic resin is dissolved or dispersed in an amount of 5.0 mass % is higher than the ORP value when the acidic resin is dissolved or dispersed in an amount of 0.5 mass %.

The ORP value when the acidic resin is dissolved or dispersed in water in an amount of 5.0 mass % is preferably higher than 0 mV.

In those cases where the acidic resin includes a basic group in addition to the acidic group, it is preferable that the above described tendency of increase in the ORP value is exhibited.

The acidic resin is preferably a solid resin at 23° C.

From the viewpoints of reducing strike-through and improving image density, the solubility of the acidic resin in the non-aqueous solvent of the ink, expressed as an amount of the resin that can dissolve in 100 g of the non-aqueous solvent of the ink at 23° C., is preferably not more than 1 g. Ensuring that the acidic resin is difficult to dissolve in the non-aqueous solvent may also contribute to a lowering of the ink viscosity.

The weight average molecular weight of the acidic resin may vary depending on the type of resin, but for example, is preferably from 5,000 to 200,000, and more preferably from 10,000 to 150,000. For example, the weight average molecular weight of an acidic urethane resin is preferably from 5,000 to 50,000, and more preferably from 10,000 to 30,000. The weight average molecular weight of an acidic (meth)acrylic resin is preferably from 10,000 to 200,000, and more preferably from 30,000 to 150,000.

The resin weight average molecular weight refers to a value determined by the GPC method relative to standard polystyrenes. This also applies to weight average molecular weight values described below for resins and the like.

For example, in the case where the dispersant is produced using a method that employs water evaporation of a water-in-oil (W/O) emulsion, an acidic water-dispersible resin is preferably used to form the acidic resin. The acidic water-dispersible resin is preferably added during production of the ink, for example in the form of a dispersion that has been dispersed in advance in a liquid such as water (an oil-in-water (O/W) resin emulsion). When a water dispersion is used, the water contained in the water dispersion is preferably removed during the ink production process.

The acidic water-dispersible resin may be a resin in which acidic groups of the resin exist at the particle surfaces, such as a self-emulsifying resin, or may be a resin that has been subjected to a surface treatment such as adhering an acidic dispersant for resin particles to the surfaces of the resin particles. The acidic resin may be obtained by either of these methods. Representative examples of the acidic groups include a carboxy group, a sulfo group and a phosphoric acid group. Examples of the acidic dispersant for resin particles include anionic surfactants and the like.

There are no particular limitations on the synthesis method for an acidic urethane resin. The acidic urethane resin may be obtained, for example, by reacting a polyol and a polyisocyanate.

Examples of the polyol include polytetramethylene glycol, 2,2-dimethylolbutanoic acid, 1,4-butanediol and diethanolamine. Further, a diol obtained by subjecting a dialkanolamine such as diethanolamine and a compound having an acryloyloxy group such as acrylic acid to the Michael addition reaction may also be used. One of these polyols may be used alone, or a combination of two or more polyols may be used. At least one of the polyols used preferably has an acidic group.

A diisocyanate such as hexamethylene diisocyanate or the like may be used as the polyisocyanate. A single polyisocyanate may be used alone, or a combination of two or more polyisocyanates may be used.

An acidic urethane-urea resin can be obtained, for example, by reacting a polyol and a polyisocyanate to obtain a urethane prepolymer, and then reacting the obtained urethane prepolymer with water and/or a polyamine compound. The polyol and the polyisocyanate are as described above. Examples of compounds that may be used as the polyamine compound include hexanediamine and the like.

There are no particular limitations on the synthesis method for an acidic (meth)acrylic resin. For example, the acidic (meth)acrylic resin may be obtained by conducting a polymerization using one monomer, or two or more monomers, among (meth)acrylate esters such as alkyl (meth)acrylates and (meth)acrylic acid and the like. At least one of the monomers used in the synthesis of the acidic (meth)acrylic resin preferably has an acidic group.

A water dispersion of the acidic water-dispersible resin may be a dispersion in which the resin is dispersed in water such as ion-exchanged water, and when producing a water dispersion by dispersing the resin in water, a low-molecular weight amine compound described below is preferably added. A low-molecular weight amine compound may also be added to a commercially available water dispersion of an acidic water-dispersible resin.

Examples of commercially available water dispersions of acidic water-dispersible urethane resins include TAKELAC WS-5984 (a product name) and TAKELAC WS-4022 (a product name) manufactured by Mitsui Chemicals, Inc., SUPERFLEX 740 (a product name) and SUPERFLEX 150H (a product name) manufactured by DKS Co., Ltd., UCOAT UWS-145 (a product name) manufactured by Sanyo Chemical Industries, Ltd., and DAOTAN TW-6493 (a product name) and DAOTAN TW-6490 (a product name) manufactured by Daicel Allnex Ltd.

Examples of commercially available water dispersions of acidic water-dispersible urethane-(meth)acrylic resins include DAOTAN VTW-1262 (a product name) manufactured by Daicel Annex Ltd.

The urethane resins of TAKELAC WS-5984, TAKELAC WS-4022, SUPERFLEX 740, SUPERFLEX 150H, UCOAT UWS-145, DAOTAN TW-6493, DAOTAN TW-6490 and DAOTAN VTW-1262 are urethane-urea resins that have a urea group.

Examples of commercially available water dispersions of acidic water-dispersible (meth)acrylic resins include Mowinyl 6750 (a product name) and Mowinyl 6969D (a product name) manufactured by Japan Coating Resin Co., Ltd.

In the dispersant, a single acidic resin may be used alone, or a combination of two or more acidic resins may be used.

The basic group of the low-molecular weight amine compound may bond with an acidic group of the acidic resin. As a result, the amount of free acidic groups may be reduced, and an ink may be formed in which aggregates are less likely to form even upon exposure to external forces.

The low-molecular weight amine compound is preferably a compound having a molecular weight of not more than 1,000, more preferably a compound having a molecular weight of not more than 700, even more preferably a compound having a molecular weight of not more than 400, and still more preferably a compound having a molecular weight of 300 or less.

The low-molecular weight amine compound preferably does not have repeating units.

Examples of compounds that may be used as the low-molecular weight amine compound include ammonia, primary amine compounds, secondary amine compounds, and tertiary amine compounds.

Examples of the primary amine compounds include monomethylamine, monoethylamine, monobutylamine, and monoethanolamine.

Examples of the secondary amine compounds include dimethylamine, diethylamine, dibutylamine, diethanolamine, diisopropanolamine, and methylpropanolamine.

Examples of the tertiary amine compounds include trialkylamines, examples thereof including trialkylamines having an alkyl group having 1 to 4 carbon atoms, such as trimethylamine, triethylamine and dimethylethylamine; alkanolamines, examples thereof including dimethylethanolamine, methyldiethanolamine, triethanolamine and triisopropanolamine; and heterocyclic amines, examples thereof including morpholine compounds such as N-substituted morpholine compounds typified by N-alkylmorpholines.

From the viewpoint of suppressing aggregate formation over a long period of time, the low-molecular weight amine compound is preferably a compound of low volatility. From this viewpoint, the low-molecular weight amine compound is preferably an alkanolamine such as monoethanolamine, diethanolamine, diisopropanolamine, methylpropanolamine, dimethylethanolamine, methyldiethanolamine, triethanolamine or triisopropanolamine.

In the dispersant, a single low-molecular weight amine compound may be used alone, or a combination of two or more low-molecular weight amine compounds may be used.

The basic polymer has a basic group. The basic group of the basic polymer may bond with the acidic group of the acidic resin. As a result, the amount of free acidic groups may be reduced, and an ink may be formed in which aggregates are less likely to form even upon exposure to external forces.

The weight average molecular weight of the basic polymer is preferably at least 5,000, and more preferably 7,000 or greater. The weight average molecular weight of the basic polymer is preferably not more than 50,000, and more preferably 30,000 or less.

The weight average molecular weight of the basic polymer is, for example, preferably from 5,000 to 50,000, and more preferably from 7,000 to 30,000.

The basic polymer is preferably soluble in the non-aqueous solvent contained in the ink. Specifically, when equal volumes of the basic polymer and the non-aqueous solvent contained in the ink are mixed together at 1 atmosphere and 20° C., the two substances preferably dissolve uniformly without separating into two phases.

The basic polymer is preferably a compound for which, when the basic polymer is dissolved in a non-aqueous solvent, the oxidation-reduction potential (ORP value) decreases as the concentration of the basic polymer increases. For example, when the basic polymer is dissolved in a solvent capable of dissolving the basic polymer, it is preferable that the ORP value when the basic polymer is dissolved in an amount of 5.0 mass % is lower than the ORP value when the basic polymer is dissolved in an amount of 0.5 mass %.

The ORP value when the basic polymer is dissolved in dodecane in an amount of 5.0 mass % is preferably not higher than 0 mV.

The basic polymer may include an acidic group such as a sulfa group or a carboxyl group, in addition to the basic group. In those cases where the basic polymer includes an acidic group in addition to the basic group, it is preferable that this tendency of decrease in the ORP value is exhibited.

Examples of the basic group include an amino group, imino group, morpholino group and pyridyl group. Examples of the amino group include an unsubstituted amino group, and substituted amino groups such as mono- or di-alkyl amino groups (such as a dimethylamino group). In the substituted amino group, the substituent such as an alkyl group may be further substituted with a substituent or the like such as a hydroxyl group or an aryl group. Among these basic groups, an amino group, imino group or morpholino group is preferred.

Examples of the basic group of the basic polymer further include nitrogen-containing functional groups having a urethane linkage or the like. A nitrogen-containing structural unit such as a urethane linkage may be introduced into the basic polymer.

The basic polymer may contain only one type, or may contain two or more types, of basic group.

Examples of the basic polymer include modified polyurethanes, basic group-containing poly(meth)acrylates, basic group-containing polyesters, polyesteramines, polyester polyamines, polyester polyimines, polyalkylolaminoamides and salts thereof, and polyether polyamines, and of these, polyester polyamines, polyester polyimines, polyalkylolaminoamides and salts thereof and polyether polyamines are preferred.

Examples of the basic polymer include linear or branched polymers having a basic group at a terminal of the main chain, basic polymers having a basic group and having a plurality of side chains (hereafter sometimes referred to as "basic polymers having a comb-like structure" or "basic comb-like polymers"), and basic polymers that are basic (meth)acrylic resins (hereafter sometimes referred to as "basic (meth)acrylic-based polymers").

From the viewpoints of improving the image density, improving the color development, and reducing image strike-through, the basic polymer preferably has a basic group, and a β-dicarbonyl group and/or an alkyl group, and more preferably has a basic group, a β-dicarbonyl group and an alkyl group. Two or three of the basic group, the β-dicarbonyl group and the alkyl group may be included within the same unit, but it is preferable that the basic group, the β-dicarbonyl group and the alkyl group are included in mutually different units. Examples of β-dicarbonyl groups that may be used include those groups that can be used in the basic (meth)acrylic-based polymer described below. Examples of alkyl groups that may be used include those groups that can be used in the basic (meth)acrylic-based polymer described below.

The basic polymer having a basic group, a β-dicarbonyl group and/or an alkyl group may, for example, be a basic (meth)acrylic-based polymer having a basic group, a β-dicarbonyl group and/or an alkyl group.

From the viewpoint of improving the storage stability by improving the dispersion stability, the basic polymer preferably includes a basic polymer that is a polymer having a basic group and a plurality of side chains (a basic comb-like polymer). The basic comb-like polymer has a comb-like structure composed of a main chain and a plurality of side chains.

The basic comb-like polymer preferably has a side chain that contains a polyester portion. Examples of the polyester portion of the side chain of the basic comb-like polymer include structures derived from a hydroxycarboxylic acid or from a mixture of a hydroxycarboxylic acid and a carboxylic acid that does not have a hydroxyl group, and polymers having a carbonyl-C3 to C6-alkyleneoxy group as a unit. Examples of structures derived from a mixture of a hydroxycarboxylic acid and a carboxylic acid that does not have a hydroxyl group include a carbonyl-C17-alkyleneoxy group derived from the self-condensation product of 12-hydroxystearic acid. Examples of the carbonyl-C3 to C6-alkyleneoxy group include a carbonyl-C5-alkyleneoxy group, and for example, a polymer containing a carbonyl-C5-alkyleneoxy group as a unit can be obtained by ring-opening polymerization of ε-caprolactone.

There are no particular limitations on the degree of polymerization of the polyester portion. The degree of polymerization of the polyester portion may be, for example, a value of about 2 to 801. The basic comb-like polymer preferably has a plurality of side chains that contain a polyester portion.

The basic comb-like polymer may, for example, contain a basic group within the main chain skeleton in the form of a polyamine skeleton or the like, and/or may contain a basic group that is bonded to the main chain either directly or via a linking group.

In those cases where the basic comb-like polymer includes a basic group that is bonded to the main chain either directly or via a linking group, the basic comb-like polymer may have one or more, but preferably has two or more, of these basic groups. There are no particular limitations on the type of basic group that is bonded to the main chain either directly or via a linking group, and examples include the basic groups described above. Of these groups, an amino group or a morpholine group is preferred, and an amino group is more preferred.

Examples of the basic comb-like polymer include basic polymers having a main chain containing a polyamine skeleton and also having a plurality of side chains (hereafter sometimes referred to as a "basic comb-like polymer a"), and basic polymers having basic groups bonded to the main chain either directly or via a linking group, and also having a plurality of side chains (hereafter sometimes referred to as a "basic comb-like polymer b").

First is a description of the polymers having a main chain containing a polyamine skeleton and also having a plurality of side chains (the basic comb-like polymer a).

In the basic comb-like polymer a, examples of the main chain polyamine skeleton include polyalkyleneimine skeletons. Examples of the polyalkyleneimine of the polyalkyleneimine skeleton include polymers obtained by using typical methods to polymerize one type, or two or more types of alkyleneimines of 2 to 8 carbon atoms such as ethyleneimine, propyleneimine, butyleneimine, dimethylethyleneimine, pentyleneimine, hexyleneimine, heptyleneimine and octyleneimine, and preferably alkyleneimines of 2 to 4 carbon atoms, as well as chemically modified polymers obtained by reacting the above polyalkyleneimines with any of various compounds.

Examples of the basic comb-like polymer a include graft polymers in which the main chain includes a polyamine skeleton such as a polyalkyleneimine, and the graft chains contain a polyester chain. The weight average molecular weight of these polymers containing a polyamine skeleton that represents the main chain is not particularly limited, but is preferably not more than 600,000.

The basic comb-like polymer preferably include side chains bonded via an amide linkage to a nitrogen atom of the polyamine skeleton of the main chain.

There are no particular limitations on the method used for producing the basic comb-like polymer a. A basic comb-like polymer containing a main chain that includes a polyamine skeleton such as a polyalkyleneimine skeleton and side chains containing a polyester portion can be obtained, for example, by a method that includes reacting a polyamine such as a polyalkyleneimine with a polyester having a free carboxyl group.

The basic comb-like polymer a has a polyamine skeleton, but may also have one or more other basic groups, and for example, may have a basic group bonded to the main chain either directly or via a linking group.

Next is a description of the basic polymers having basic groups bonded to the main chain either directly or via a linking group, and also having a plurality of side chains (the basic comb-like polymer b).

The basic comb-like polymer b may have one or more basic groups bonded to the main chain either directly or via a linking group, and preferably has two or more of these basic groups. There are no particular limitations on the type of basic group, and the basic groups described above may be used. Of these groups, an amino group or a morpholine group is preferred, and an amino group is particularly desirable. The basic comb-like polymer b may contain only one type, or may contain two or more types, of basic group.

Examples of the basic comb-like polymer h include copolymers containing a unit having a basic group bonded to the main chain either directly or via a linking group (hereafter sometimes referred to as "unit Xa") and a unit having a side chain containing a polyester portion (hereafter sometimes referred to as "unit Xb").

In the unit Xa, there are no particular limitations on the basic group, and the types of basic groups described above may be used. Among these, an amino group or a morpholino group is preferred, and an amino group is more preferred.

For example, the unit Xa may be an acrylic unit or a methacrylic unit.

Examples of the unit Xa include units in which a carbonyl group is bonded to a carbon atom of the main chain, and a basic group is bonded to this carbonyl group, either directly or via a linking group. Examples of this type of unit include units derived from monomers containing an acryloyl group or a methacryloyl group and a basic group. The basic group is preferably bonded to the carbon atom of the carbonyl (CO) of the acryloyl group or methacryloyl group, either directly or via a linking group.

Specific examples of monomers containing an acryloyl group or a methacryloyl group and a basic group include dimethylaminoethyl (meth)acrylate and diethylaminoethyl (meth)acrylate.

The unit Xa may be a unit derived from a monomer obtained by adding an amine compound to a monomer having an epoxy group. The monomer having an epoxy group is preferably a monomer having an acryloyl group or a methacryloyl group and an epoxy group. Examples of the aforementioned monomer containing an acryloyl group or a methacryloyl group and a basic group also include monomers obtained by adding an amine compound to a monomer having an acryloyl group or a methacryloyl group and an epoxy group.

In the monomer having an acryloyl group or a methacryloyl group and an epoxy group, the epoxy group is preferably bonded to the carbon atom of the carbonyl (CO) of the acryloyl group or methacryloyl group, either directly or via a linking group, Specific examples of the monomer having an acryloyl group or a methacryloyl group and an epoxy group include glycidyl (meth)acrylate, 4-hydroxybutyl (meth)acrylate glycidyl ether, and 3,4-epoxycyclohexylmethyl (meth)acrylate.

The amine compound that may be added to the monomer having an epoxy group is preferably an amine compound having a hydroxyl group (such as an alkanolamine). Specific examples of amine compounds having a hydroxyl group include benzylethanolamine, monoethanolamine and diethanolamine, and diethanol amine is particularly preferred.

Examples of the monomer obtained by adding an amine compound to a monomer having an acryloyl group or a methacryloyl group and an epoxy group include a diethanolamine adduct of glycidyl(meth)acrylate, and a benzylethanolamine adduct of glycidyl (meth)acrylate.

The unit derived from a monomer obtained by adding an amine compound to a monomer having an epoxy group can be obtained, for example, by adding an amine compound to a unit derived from a monomer having an epoxy group, and a unit obtained in this manner may also be used.

The unit having a side chain containing a polyester portion (the unit Xb) may, for example, be an acrylic unit or a methacrylic unit.

Examples of the unit Xb include units in which a carbonyl group is bonded to a carbon atom of the main chain, and a polyester portion is bonded to this carbonyl group, either directly or via a linking group. Examples of this type of unit include units derived from monomers containing an acryloyl group or a methacryloyl group and a polyester portion. The polyester portion is preferably bonded to the carbon atom of the carbonyl (CO) of the acryloyl group or methacryloyl group, either directly or via a linking group.

The monomer containing an acryloyl group or a methacryloyl group and a polyester portion can be obtained, for example, by reacting a monomer having an acryloyl group or a methacryloyl group and an epoxy group with a hydroxycarboxylic acid condensate or the like. Examples of the monomer having an acryloyl group or a methacryloyl group and an epoxy group include the monomers having an acryloyl group or a methacryloyl group and an epoxy group described above. Examples of hydroxycarboxylic acid condensates that may be used include 12-hydroxystearic acid 6-condensate and the like. The reaction may, for example, use a catalyst such as tetrabutylammonium bromide and/or a polymerization inhibitor such as aluminum N-nitrosophenylhydroxylamine.

The basic comb-like polymer b may also contain one or more other units. Examples of these other units include units having an alkyl group of 1 to 8 carbon atoms (hereafter sometimes referred to as "unit Xc"). The alkyl group of 1 to 8 carbon atoms is more preferably an alkyl group of 1 to 4 carbon atoms. Examples of the alkyl group of 1 to 8 carbon atoms include a methyl group, ethyl group, butyl group and 2-ethylhexyl group.

For example, the unit having an alkyl group of 1 to 8 carbon atoms (the unit Xc) may be an acrylic unit or a methacrylic unit.

Examples of the unit Xc include units in which a group represented by —COOR$^d$ is bonded to a carbon atom of the main chain, wherein R$^d$ is an alkyl group of 1 to 8 carbon atoms (and preferably 1 to 4 carbon atoms).

For example, units derived from a monomer Xc described below may be used as the unit Xc.

The basic comb-like polymer b may contain only one type, or may contain two or more types, of the unit Xa. Similarly, the basic comb-like polymer b may contain only one type, or may contain two or more types, of the unit Xb. Further, in those cases where the basic comb-like polymer contains a unit Xc, either one type, or two or more types, of the unit Xc may be included in the basic corn-like polymer b.

The amount of the unit Xa, relative to the total mass of the polymer, is, for example, preferably from 1 to 50% by mass, more preferably from 2 to 40% by mass, and even more preferably from 2 to 30% by mass.

The amount of the unit Xb, relative to the total mass of the polymer, is, for example, preferably from 10 to 95% by mass, more preferably from 20 to 90% by mass, and even more preferably from 40 to 85% by mass.

When the unit Xc is included, the amount of the unit Xc, relative to the total mass of the polymer, is, for example, preferably from 1 to 90% by mass, more preferably from 5 to 50% by mass, and even more preferably from 5 to 30% by mass.

Here, the total mass of the polymer is based on the combined mass of all of the units that constitute the basic comb-like polymer b.

The basic comb-like polymer b can be obtained, for example, by polymerizing a monomer mixture containing a monomer having a basic group (hereafter sometimes referred to as "monomer Xa") and a monomer having a side chain containing a polyester portion (hereafter sometimes referred to as "monomer Xb").

Examples of the monomer having a basic group (the monomer Xa) include the aforementioned monomers containing an acryloyl group or a methacryloyl group and a basic group. Examples of the monomer having a side chain containing a polyester portion (the monomer Xb) include the aforementioned monomers containing an acryloyl group or a methacryloyl group and a polyester portion.

The monomer mixture may contain, in addition to the monomer having a basic group (the monomer Xa), or instead of the monomer Xa, an aforementioned monomer having an epoxy group (such as a monomer having an acryloyl group or a methacryloyl group and an epoxy group), and following polymerization of the monomer mixture, a unit having a basic group (the unit Xa) may be obtained by reacting an amine compound with the structure derived from the monomer having an epoxy group.

The monomer mixture may also contain one or more other monomers, and examples of these other monomers include monomers having an alkyl group of 1 to 8 carbon atoms (hereafter sometimes referred to as "monomer Xc"). The monomer having an alkyl group of 1 to 8 carbon atoms (the monomer Xc) is preferably a monomer having an acryloyl group or a methacryloyl group and an alkyl group of 1 to 8 carbon atoms. Preferred examples of the monomer Xc include alkyl (meth)acrylates having an alkyl group of 1 to 8 carbon atoms. Specific examples of the monomer Xc include methyl (meth)acrylate, ethyl (meth)acrylate, butyl (meth)acrylate and 2-ethylhexyl (meth)acrylate. The blend amount of each monomer in the monomer mixture may be adjusted so as to achieve the desired proportion for each of the units described above.

The monomer mixture may be polymerized, for example, by conventional radical copolymerization. The reaction is preferably conducted as either a solution polymerization or a dispersion polymerization. During the polymerization reaction, appropriate amounts of a polymerization initiator, chain transfer agent, polymerization inhibitor, polymerization promoter and/or dispersant or the like may be added to the reaction system. Examples of polymerization initiators that may be used include t-butylperoxy-2-ethylhexanoate and the like. There are no particular limitations on the polymerization solvent (reaction solvent) used in a solution polymerization, but the solvent is preferably capable of dispersing or dissolving the resin produced by the polymerization.

The weight average molecular weight of the basic comb-shaped polymer b is preferably from 5,000 to 50,000, and more preferably from 10,000 to 30,000.

From the viewpoint of lowering the ink viscosity, the basic polymer preferably includes a polymer that is a basic (meth)acrylic resin (namely, a basic (meth)acrylic-based polymer). A basic (meth)acrylic resin is a (meth)acrylic resin that has a basic group.

The basic (meth)acrylic-based polymer contains a basic group, and preferably also has a β-dicarbonyl group and/or an alkyl group. For example, from the viewpoints of lowering the ink viscosity, improving the image density, improving the color development properties and reducing image strike-through, the basic (meth)acrylic-based polymer preferably has a basic group, a β-dicathonyl group and an alkyl group. Two or three of the basic group, the β-dicarbonyl group and the alkyl group may be included in the same unit, but it is preferable that the basic group, the β-dicarbonyl group and the alkyl group are included in mutually different units. Examples of this type of basic (meth)acrylic-based polymer include basic (meth)acrylic-based polymers containing a unit having a basic group (hereafter sometimes referred to as "unit Ya"), a unit having a β-dicarbonyl group (hereafter sometimes referred to as "unit Yb"), and a unit having an alkyl group (hereafter sometimes referred to as "unit Yc").

Examples of the basic(meth)acrylic-based polymer include copolymers of a monomer mixture containing a monomer having a basic group (hereafter sometimes referred to as "monomer Ya"), a monomer having a β-dicarbonyl group (hereafter sometimes referred to as "monomer Yb") and a monomer having an alkyl group (hereafter sometimes referred to as " monomer Yc"), and copolymers obtained using such copolymers.

There are no particular limitations on the basic group, and for example, the basic groups described above may be used. Of these, an amino group or a morpholino group is preferred, and an amino group is more preferred. The basic (meth) acrylic-based polymer may have only one type, or may have two or more types, of the basic group. The basic group is preferably bonded to the main chain either directly or via a linking group.

As the unit having a basic group (the unit Ya), any of the units described above for the unit Ya may be used. The basic (meth)acrylic-based polymer may have only one type, or may have two or more types, of the unit Ya.

The alkyl group is preferably an alkyl group of 8 to 22 carbon atoms, and more preferably an alkyl group of 12 to 22 carbon atoms. The alkyl group of 8 to 22 carbon atoms may be linear or branched. Specific examples of the alkyl group having 8 to 22 carbon atoms include an octyl group, a nonyl group, a decyl group, a undecyl group, a dodecyl group, a tridecyl group, a tetradecyl group, a pentadecyl group, a hexadecyl group, a heptadecyl group, an octadecyl group, a nonadecyl group, an eicosyl group and a docosyl group. The basic (meth)acrylic-based polymer may contain only one type, or may contain a plurality of types, of these alkyl groups.

For example, the unit having an alkyl group (the unit Yc) may be an acrylic unit or a methacrylic unit.

Examples of the unit Yc include units in which a group represented by —COOR$^e$ is bonded to a carbon atom of the main chain of the basic (meth)acrylic-based polymer, wherein R$^e$ is an alkyl group (preferably an alkyl group of 8 to 22 carbon atoms, and more preferably 12 to 22 carbon atoms).

For example, units derived from a monomer Yc described below may be used as the unit Yc.

The basic (meth)acrylic-based polymer may contain only one type, or may contain two or more types, of the unit Yc.

Examples of the β-dicarbonyl group include β-diketone groups such as an acetoacetyl group and a propionacetyl group, and β-keto acid ester groups such as an acetoacetoxy group and a propionacetoxy group. The basic (meth)acrylic-based polymer may contain only one type, or may contain a plurality of types, of these β-dicarbonyl groups.

For example, the unit having a β-dicarbonyl group (the unit Yb) may be an acrylic unit or a methacrylic unit.

Examples of the unit Yb include units in which a carbonyl group is bonded to a carbon atom of the main chain, and a β-dicarbonyl group is then bonded to the carbon atom of that carbonyl group, either directly or via a linking group.

The unit Yb is preferably a unit derived from a (meth) acrylate having a β-dicarbonyl group, or a unit derived from a (meth)acrylamide having a β-dicarbonyl group or the like. Preferred examples of (meth)acrylates having a β-dicarbonyl group include (meth)acrylates having a β-diketone group or β-keto acid ester group bonded indirectly to the carbon atom of the carbonyl (CO) of an acryloyl group or methacryloyl group. Preferred examples of (meth)acrylamides having a β-dicarbonyl group include (meth)acrylamides having a β-diketone group or β-keto acid ester group bonded indirectly to the carbon atom of the carbonyl (CO) of an acryloyl group or methacryloyl group. For example, units derived from a monomer Yb described below may be used as the unit b.

The basic (meth)acrylic-based polymer may contain only one type, or may contain two or more types, of the unit Yb.

The basic (meth)acrylic-based polymer may also contain one or more other units.

The amount of the unit having a basic group (the unit Ya), relative to the total mass of the polymer, is preferably from 5 to 30% by mass, and more preferably from 10 to 25% by mass.

The amount of the unit having an alkyl group (the unit Yc), relative to the total mass of the polymer, is preferably from 40 to 90% by mass, more preferably from 50 to 90% by mass, and even more preferably from 60 to 80% by mass.

The amount of the unit having a β-dicarbonyl group (the unit Yb), relative to the total mass of the polymer, is preferably from 5 to 30% by mass, and more preferably from 10 to 20% by mass.

Here, the total mass of the polymer is based on the combined mass of all of the units that constitute the basic (meth)acrylic-based polymer.

The basic (meth)acrylic-based polymer can be obtained, for example, by polymerizing a monomer mixture containing a monomer having a basic group (the monomer Ya), a monomer having a β-dicarbonyl group (the monomer Yb), and a monomer having an alkyl group (the monomer Yc).

Examples of the monomer Ya include the same monomers as those described above for the monomer Xa.

The monomer Yc is, for example, preferably a monomer having an acryloyl group or a methacryloyl group and an alkyl group. Examples of the monomer Yc include alkyl (meth)acrylates, wherein alkyl (meth)acrylates having an alkyl group of 8 to 22 carbon atoms are preferred, and alkyl (meth)acrylates having an alkyl group of 12 to 22 carbon atoms are more preferred. Specific examples of the monomer Yc include behenyl (meth)acrylate and lauryl (meth) acrylate.

The monomer Yb is, for example, preferably a monomer having an acryloyl group or a methacryloyl group and a β-dicarbonyl group. Preferred examples of the monomer Yb include (meth)acrylates having a β-dicarbonyl group and (meth)acrylamides having a β-dicarbonyl group. Specific examples of the monomer Yb include acetoacetoxyalkyl (meth)acrylates such as acetoacetoxyethyl (meth)acrylate, hexadione (meth)acrylate, and acetoacetoxyalkyl (meth) acrylamides such as acetoacetoxyethyl (meth)acrylamide.

The monomer mixture may also contain one or more other monomers.

For example, the monomer mixture may contain, in addition to the monomer having a basic group (the monomer Ya), or instead of the monomer Ya, an aforementioned monomer having an epoxy group (such as a monomer having an acryloyl group or a methacryloyl group and an epoxy group), and following polymerization of the monomer mixture, a unit having a basic group (the unit Ya) may be obtained by reacting an amine compound, described above as an amine compound that can be added to a monomer having an epoxy group, with the structure derived from the monomer having an epoxy group.

The blend amount of each monomer in the monomer mixture may be adjusted so as to achieve the desired proportion for each of the units described above. The monomer mixture may be polymerized by conventional radical copolymerization. Examples of polymerization methods that may be used include the methods described above in relation to the basic comb-shaped polymer b.

There are no particular limitations on the weight average molecular weight of the basic (meth)acrylic-based polymer, but from the viewpoints of the ink stability and the ink viscosity, the weight average molecular weight is preferably from 5,000 to 30,000.

Examples of commercially available basic polymers include:

Solsperse 11200, Solsperse 13940, Solsperse 16000, Solsperse 17000, Solsperse 18000, Solsperse 19000, Solsperse 24000, Solsperse 32000, Solsperse 38500, Solsperse 39000, Solsperse 71000, Solsperse 22000 and Solsperse 28000 (all product names), manufactured by The Lubrizol Corporation;

DISPERBYK 109 (a product name), manufactured by BYK-Chemie Japan K.K.;

ACETAMIN 24 and ACETAMIN 86 (both product names), manufactured by Kao Corporation;

HYPERMER KD3 and HYPERMER KD11 (both product names), manufactured by Croda Japan K.K.;

AJISPER PB-821 (a product name), manufactured by Ajinomoto Fine-Techno Co., Inc.; and ANTARON V-216 and ANTARON V-220 (both product names), manufactured by ISP Japan Ltd.

In the dispersant, a single basic polymer may be used alone, or a combination of two or more basic polymers may be used. For example, from the viewpoints of the image density and the storage stability, the use of a combination of a basic comb-shaped polymer and a basic (meth)acrylic-based polymer is preferred.

The total amount of the acidic resin and the low-molecular weight amine compound relative to the total mass of the acidic resin, the low-molecular weight amine compound and the basic polymer is preferably at least 10% by mass, more preferably at least 20% by mass, and even more preferably 30% by mass or greater. On the other hand, the total amount of the acidic resin and the low-molecular weight amine compound relative to the total mass of the acidic resin, the low-molecular weight amine compound and the basic polymer is preferably not more than 90% by mass, more preferably not more than 80% by mass, and even more preferably 70% by mass or less. The total amount of the acidic resin and the low-molecular weight amine compound relative to the total mass of the acidic resin, the low-molecular weight amine compound and the basic polymer is, for example, preferably from 10 to 90% by mass, more preferably from 20 to 80% by mass, and even more preferably from 30 to 70% by mass.

The amount of the basic polymer relative to the total amount of the acidic resin, the low-molecular weight amine compound and the basic polymer is preferably at least 10% by mass, more preferably at least 20% by mass, and even more preferably 30% by mass or greater. On the other hand, the amount of the basic polymer relative to the total amount of the acidic resin, the low-molecular weight amine compound and the basic polymer is preferably not more than 90% by mass, more preferably not more than 80% by mass, and even more preferably 70% by mass or less. The amount of the basic polymer relative to the total amount of the acidic resin, the low-molecular weight amine compound and the basic polymer is, for example, preferably from 10 to 90% by mass, more preferably from 20 to 80% by mass, and even more preferably from 30 to 70% by mass.

The low-molecular weight amine compound is preferably used in an amount that yields a molar ratio of basic groups in the low-molecular weight amine compound relative to acidic groups in the acidic resin (basic groups/acidic groups) of 0.5 to 1.5, and is more preferably used in an amount that yields a molar ratio of 0.8 to 1.2 In those cases where an acidic water-dispersible resin is used that has undergone surface treatment, for example by adhering an acidic dispersant to the surfaces of the resin particles, the acidic groups of the acidic resin also include the acidic groups of the acidic dispersant.

The mass ratio between the acidic resin and the basic polymer (acidic resin:basic polymer) is preferably within a range from 10:90 to 90:10, more preferably from 20:80 to 80:20, and even more preferably from 30:70 to 70:30.

The amount of the acidic resin relative to the total mass of the ink is preferably from 0.1 to 20% by mass, more preferably from 0.1 to 10% by mass, and even more preferably from 0.5 to 10% by mass.

The amount of the basic polymer relative to the total mass of the ink is preferably from 0.1 to 10% by mass, more preferably from 0.5 to 10% by mass, even more preferably from 1 to 5% by mass, and still more preferably from 1.5 to 5% by mass.

From the viewpoint of ensuring satisfactory pigment dispersibility, the amount of the dispersant, expressed as the total mass of the acidic resin, the low-molecular weight amine compound and the basic polymer relative to the total mass of the ink, is preferably at least 0.1% by mass, more preferably at least 1% by mass, and even more preferably 2% by mass or greater.

On the other hand, from the viewpoints of the ink viscosity and the storage stability under high-temperature conditions, the amount of the dispersant, expressed as the total mass of the acidic resin, the low-molecular weight amine compound and the basic polymer relative to the total mass of the ink, is preferably not more than 20% by mass, more preferably not more than 10% by mass, and even more preferably 8% by mass or less. For example, the amount of the dispersant, expressed as the total mass of the acidic resin, the low-molecular weight amine compound and the basic polymer relative to the total mass of the ink, is preferably from 0.1 to 20% by mass, more preferably from 1 to 10% by mass, and even more preferably from 2 to 8% by mass.

The amount of the dispersant, expressed as a mass ratio of the total of the acidic resin, the low-molecular weight amine compound and the basic polymer relative to a value of 1 for the pigment, is preferably within a range from 0.1 to 5, and more preferably from 0.1 to 1.

Examples of the non-aqueous solvent include non-polar organic solvents and polar organic solvents. These solvents may be used individually, or combinations of two or more solvents may be used, provided the solvents form a single phase. In an embodiment of the present invention, a water-insoluble organic solvent that does not mix uniformly with an equal volume of water at 1 atmosphere and 20° C. is preferably used as the non-aqueous solvent.

Examples of preferred non-polar organic solvents include petroleum-based hydrocarbon solvents such as aliphatic hydrocarbon solvents, alicyclic hydrocarbon solvents and aromatic hydrocarbon solvents.

Examples of the aliphatic hydrocarbon solvents and alicyclic hydrocarbon solvents include paraffin-based non-aqueous solvents, isoparaffin-based non-aqueous solvents, and naphthene-based non-aqueous solvents. Specific examples of preferred commercially available products include No. 0 Solvent L, No. 0 Solvent M, No. 0 Solvent H, Cactus Normal Paraffin N-10, Cactus Normal Paraffin N-11, Cactus Normal Paraffin N-12, Cactus Normal Paraffin N-13, Cactus Normal Paraffin N-14, Cactus Normal Paraffin N-15H, Cactus Normal Paraffin YHNP, Cactus Normal Paraffin SHNP, Isosol 300, Isosol 400, Teclean N-16, Teclean N-20, Teclean N-22, AF Solvent No. 4, AF Solvent No, 5, AF Solvent No. 6, AF Solvent No. 7, Naphtesol 160, Naphtesol 200 and Naphtesol 220 (all manufactured by JXTG Nippon Oil & Energy Corporation); Isopar G, Isopar H, Isopar L, Isopar M, Exxsol D40, Exxsol D60, Exxsol D80, Exxsol D95, Exxsol D110 and Exxsol D130 (all manufactured by Exxon Mobil Corporation); and MORESCO White P-40, MORESCO White P-60, MORESCO White P-70, MORESCO White P-80, MORESCO White P-100, MORESCO White P-120, MORESCO White P-150, MORESCO White P-200, MORESCO White P-260 and MORESCO White P-350P (all manufactured by MORESCO Corporation).

Examples of preferred aromatic hydrocarbon solvents include Grade Alkene L and Grade Alkene 200P (both manufactured by JXTG Nippon Oil & Energy Corporation), and Solvesso 100, Solvesso 150, Solvesso 200 and Solvesso 200ND (manufactured by Exxon Mobil Corporation).

The initial boiling point of the petroleum-based hydrocarbon solvent is preferably at least 100° C., more preferably at least 150° C., and even more preferably 200° C. or higher. The initial boiling point can be measured in accordance with JIS K0066 "Test Methods for Distillation of Chemical Products".

Examples of preferred polar organic solvents include fatty acid ester-based solvents, higher alcohol-based solvents and higher fatty acid-based solvents.

Specific examples include fatty acid ester-based solvents having at least 13 carbon atoms, and preferably 16 to 30 carbon atoms, within one molecule, such as isononyl isononanoate, isodecyl isononanoate, isotridecyl isononanoate, methyl laurate, isopropyl laurate, hexyl laurate, isopropyl myristate, isopropyl palmitate, hexyl palmitate, isooctyl palmitate, isostearyl palmitate, methyl oleate, ethyl oleate, isopropyl oleate, butyl oleate, hexyl oleate, methyl linoleate, ethyl linoleate, isobutyl linoleate, butyl stearate, hexyl stearate, isooctyl stearate, isopropyl isostearate, 2-octyldecyl pivalate, methyl soybean oil, isobutyl soybean oil, methyl tallate and isobutyl tallate; higher alcohol-based solvents having at least 6 carbon atoms, and preferably 12 to 20 carbon atoms, within one molecule, such as isomyristyl alcohol, isopalmityl alcohol, stearyl alcohol, isostearyl alcohol, oleyl alcohol, isoeicosyl alcohol and decyltetradecanol; and higher fatty acid-based solvents having at least 12 carbon atoms, and preferably 14 to 20 carbon atoms, within one molecule, such as lauric acid, isomyristic acid, palmitic acid, isopalmitic acid, α-linolenic acid, linoleic acid, oleic acid and isostearic acid.

The boiling point of these polar organic solvents such as the fatty acid ester-based solvents, higher alcohol-based solvents and higher fatty acid-based solvents is preferably at least 150° C., more preferably at least 200° C., and even more preferably 250° C. or higher. These non-aqueous solvents having a boiling point of 250° C. or higher also include non-aqueous solvents that do not exhibit an actual boiling point.

The amount of the non-aqueous solvent may be adjusted as appropriate. The amount of the non-aqueous solvent relative to the total mass of the ink is preferably at least 60% by mass, and more preferably 70% by mass or greater. On the other hand, the amount of the non-aqueous solvent relative to the total mass of the ink is preferably not more than 99% by mass, and more preferably 95% by mass or less. The amount of the non-aqueous solvent relative to the total mass of the ink is, for example, preferably from 60 to 99% by mass, and more preferably from 70 to 95% by mass.

In addition to the components described above, the oil-based ink may also contain one or more of various additives. For example, appropriate amounts of any one or more of nozzle blockage prevention agents, antioxidants, conductivity adjusters, viscosity adjusters, surface tension adjusters, oxygen absorbers, and dyes and the like may be added as additives. There are no particular limitations on these additives, and any one or more of additives typically used in the technical field may be used.

The amount of water in the ink, relative to the total mass of the ink, is preferably not more than 1% by mass, more preferably less than 1% by mass, even more preferably not more than 0.5% by mass, and still more preferably 0.1% by mass or less.

The total amount of the acidic resin, the low-molecular weight amine compound and the pigment relative to the total mass of the ink is preferably from 1 to 40% by mass, and more preferably from 5 to 30% by mass. The total amount of the dispersant and the pigment in the ink, expressed as the total amount of the pigment, the acidic resin, the low-molecular weight amine compound and the basic polymer relative to the total mass of the ink, is preferably from 1 to 40% by mass, and more preferably from 5 to 30% by mass.

There are no particular limitations on the method used for producing the oil-based inkjet ink described above. For example, in-liquid drying methods can be used favorably for producing the above oil-based inkjet ink, and a method employing water evaporation of a water-in-oil (W/O) emulsion can be used particularly favorably.

One example of a method for producing the oil-based inkjet ink using water evaporation of a water-in-oil emulsion is a method that includes producing a dispersant using a method that employs water evaporation of a water-in-oil emulsion. An example of this type of method includes obtaining a water-in-oil emulsion containing a continuous phase that contains a non-aqueous solvent and a basic polymer, and a dispersed phase that contains water, an acidic water-dispersible resin and a low-molecular weight amine compound (hereafter sometimes referred to as "step 1"), removing the water from the water-in-oil emulsion to obtain a dispersant dispersion containing a dispersant formed with the acidic resin, the low-molecular weight amine compound and the basic polymer (hereafter sometimes referred to as "step 2"), and mixing the dispersant dispersion and a pigment, and dispersing the pigment (hereafter sometimes referred to as "step 3"). In step 2 in this method, for example, the dispersant dispersion may be obtained in the form of a resin particle dispersion in which the dispersant is dispersed as resin particles. However, the production method for the ink is not limited to this method. Moreover, the form of the dispersant is not limited to resin particles.

Methods that employ water evaporation of a water-in-oil emulsion do not require the use of volatile organic solvents, in general, and therefore offer excellent safety.

As the non-aqueous solvent, the basic polymer, the acidic water-dispersible resin, the low-molecular weight amine compound and the pigment, those described above in the description of the components for the ink may be respectively used.

For example, preferable examples of the acidic water-dispersible resin include acidic water-dispersible (meth) acrylic resins and acidic water-dispersible urethane resins, and more preferable examples of the acidic water-dispersible resin include acidic water-dispersible urethane-urea resins.

As the water, any of tap water, ion-exchanged water or deionized water or the like may be used.

In the water-in-oil emulsion produced in step 1, the continuous phase and the dispersed phase may each contain one or more other components.

The amount (solid fraction amount) of the acidic water-dispersible resin, relative to the total mass of the dispersed phase, is preferably from 1 to 60% by mass, more preferably from 10 to 50% by mass, and even more preferably from 20 to 40% by mass. The amount (solid fraction amount) of the acidic water-dispersible resin relative to the total mass of the water-in-oil emulsion is preferably from 0.1 to 30% by mass, more preferably from 1 to 20% by mass, and even more preferably from 5 to 1 5% by mass.

The amount (solid fraction amount) of the acidic water-dispersible resin, relative to the total mass of the dispersant dispersion obtained in step 2, is preferably at least 5% by mass, more preferably at least 10% by mass, and even more preferably 14% by mas or greater. The amount (solid fraction amount) of the acidic water-dispersible resin, relative to the total mass of the dispersant dispersion obtained in step 2, is preferably not more than 40% by mass, and more preferably 30% by mass or less. The amount (solid fraction amount) of the acidic water-dispersible resin, relative to the total mass of the dispersant dispersion obtained in step 2, is preferably from 5 to 40% by mass, more preferably from 10 to 40% by mass, and even more preferably from 14 to 30% by mass.

In the water-in-oil emulsion, the low-molecular weight amine compound is preferably used in an amount that yields an amount of basic groups relative to the amount of acidic groups of the acidic water-dispersible resin that satisfies the preferred molar ratio range described above.

In the water-in-oil emulsion, the amount of water relative to the total mass of the dispersed phase is preferably from 40 to 99% by mass, more preferably from 50 to 90% by mass, and even more preferably from 60 to 80% by mass. The amount of water relative to the total mass of the water-in-oil emulsion is preferably from 1 to 50% by mass, more preferably from 5 to 50% by mass, and even more preferably from 10 to 40% by mass.

In the water-in-oil emulsion, from the viewpoint of maintaining the stability of the water-in-oil emulsion in step 1, the amount of water is preferably an amount that results in an amount (solid fraction amount) of the acidic water-dispersible resin in the dispersed phase relative to the amount of water that is at least 20% by mass, more preferably at least 30% by mass, even more preferably at least 35% by mass, and still more preferably 40% by mass or greater. On the other hand, the amount of water is preferably an amount that results in an amount (solid fraction amount) of the acidic water-dispersible resin in the dispersed phase relative to the amount of water that is not more than 80% by mass, and more preferably 75% by mass or less. In the water-in-oil emulsion, the amount of water is, for example, preferably an amount that results in an amount (solid fraction amount) of the acidic water-dispersible resin in the dispersed phase relative to the amount of water that is from 20 to 80% by mass, more preferably from 30 to 80% by mass, even more preferably from 35 to 80% by mass, and still more preferably from 40 to 75% by mass.

The total amount of the basic polymer used in the ink may be incorporated in the water-in-oil emulsion obtained in step 1, or alternatively, only a portion of the basic polymer may be incorporated in the water-in-oil emulsion obtained in step 1, with the remainder being mixed with the pigment and the dispersant dispersion and the like during mixing of the pigment and the dispersant dispersion in step 3. The basic polymer added in step 3 or the like, may be the same as, or different from, the basic polymer contained in the water-in-oil emulsion of step 1.

In the water-in-oil emulsion, the amount of the basic polymer relative to the total mass of the continuous phase is preferably from 1 to 60% by mass, more preferably from 5 to 50% by mass, and even more preferably from 10 to 40% by mass.

In the water-in-oil emulsion, the amount of the basic polymer relative to the total mass of the water-in-oil emulsion is preferably from 1 to 40% by mass, more preferably from 5 to 30% by mass, and even more preferably from 10 to 20% by mass.

The total amount of the non-aqueous solvent used in the ink may be incorporated in the water-in-oil emulsion obtained in step 1, or alternatively, only a portion of the non-aqueous solvent may be incorporated in the water-in-oil emulsion obtained in step 1, with the remainder being mixed with the pigment and the dispersant dispersion and the like during mixing of the pigment and the dispersant dispersion in step 3. The non-aqueous solvent added in step 3 or the like may be the same as, or different from, the non-aqueous solvent included in the water-in-oil emulsion of step 1.

In the water-in-oil emulsion, the amount of the non-aqueous solvent, relative to the total mass of the continuous phase, is preferably from 40 to 99% by mass, more preferably from 50 to 95% by mass, and even more preferably from 60 to 90% by mass.

In the water-in-oil emulsion, the amount of the non-aqueous solvent, relative to the total mass of the water-in-oil emulsion, is preferably from 30 to 90% by mass, and more preferably from 40 to 80% by mass.

In step 1, there are no particular limitations on the method used for obtaining the water-in-oil emulsion.

The water-in-oil emulsion can be produced, for example, by mixing the components of the dispersed phase and the components of the continuous phase, and then emulsifying the mixture.

From the viewpoint of improving the ink dispersion stability, thereby improving the rub fastness, a mixture for the continuous phase containing the components of the continuous phase and a mixture for the dispersed phase containing the components of the dispersed phase are preferably prepared separately in advance. Subsequently, the mixture for the dispersed phase is preferably added to the mixture for the continuous phase, and emulsification is then performed. The emulsification may be performed, for example, using an emulsification apparatus such as an ultrasonic homogenizer. The emulsification may be performed while the mixture for the dispersed phase is added to the mixture for the continuous phase, or may be performed after addition of the mixture for the dispersed phase to the mixture for the continuous phase.

From the viewpoints of reducing the emulsion particle size, thereby improving the dispersion stability of the obtained ink and thus improving the rub fastness, step 1 preferably includes, for example, obtaining a mixture for a dispersed phase containing the acidic water-dispersible resin, the low-molecular weight amine compound and water (hereafter sometimes referred to a "step a-1"), obtaining a mixture for a continuous phase containing the basic polymer and the non-aqueous solvent (hereafter sometimes referred to a "step a-2"), and adding the mixture for the dispersed phase to the mixture for the continuous phase and performing an emulsification (hereafter sometimes referred to a "step a-3"). In step a-1, the mixture for the dispersed phase can be obtained, for example, by mixing the acidic water-dispersible resin, the low-molecular weight amine compound, and water, and any one or more other components as required. In step a-2, the mixture for the continuous phase can be obtained, for example, by mixing the basic polymer, and the non-aqueous solvent, and any one or more other components as required. In step a-3, the mixture for the dispersed phase obtained in step a-1 is added to the mixture for the continuous phase obtained in step a-2, and emulsification is performed. In step a-3, the emulsification may be performed, for example, while the mixture for the dispersed phase is added to the mixture for the continuous phase, or may be performed after the mixture for the dispersed phase has been added to the mixture for the continuous phase. The emulsification may be conducted, for example, using an emulsification apparatus such as an ultrasonic homogenizer.

From the viewpoint of improving the production efficiency, it is preferable that the mixture for the continuous phase and the mixture for the dispersed phase of the water-in-oil emulsion are not prepared separately in advance, but rather that the components of the continuous phase and the components of the dispersed phase are mixed together in a single batch, and the resulting mixture is then emulsified, for example, using an emulsification apparatus or the like.

From the viewpoint of improving the production efficiency, step 1 is preferably a step that includes, for example, mixing the acidic water-dispersible resin, the low-molecular weight amine compound, water, the basic polymer and the non-aqueous solvent to obtain a mixture (hereafter sometimes referred to a "step b-1"), and emulsifying the obtained mixture (hereafter sometimes referred to a "step b-2"). In those cases where the dispersed phase and/or the continuous phase contains one or more other components, these other components may be mixed with the acidic water-dispersible resin, the low-molecular weight amine compound, water, the basic polymer and the non-aqueous solvent in step b-1. In step b-2, the emulsification may be conducted, for example, using an emulsification apparatus such as an ultrasonic homogenizer.

In step 1, the composition of the water-in-oil emulsion, expressed in terms of mass ratios prior to removal of the water, preferably includes 20 to 50% by mass of the dispersed phase and 80 to 50% by mass of the continuous phase, relative to the total mass of the water-in-oil emulsion.

In step 2, the water of the dispersed phase of the water-in-oil emulsion is removed. As a result, resin particles may be formed from the remaining components of the dispersed phase and the basic polymer of the continuous phase, and a dispersant dispersion may be obtained that contains a dispersant formed with the acidic resin, the low-molecular weight amine compound and the basic polymer in the form of these resin particles. In the dispersant dispersion obtained in step 2, an acidic group of the acidic resin and a basic group of the low-molecular weight amine compound may bond together, and a basic group of the basic polymer may also bond to an acidic group of the acidic resin. In this manner, in step 2, a dispersant dispersion containing a dispersant and the non-aqueous solvent may be obtained. In step 3, additional basic polymer may be added to the dispersant obtained in step 2.

Examples of methods that may be used for removing the water include reduced pressure, heating, bubbling, desiccant addition, or a combination of these methods. The conditions for the reduced pressure and/or heating methods may be, for example, conditions by which water may be removed, but the non-aqueous solvent of the continuous phase may be retained. An evaporator or the like may be used for the reduced pressure condition. The heating temperature is preferably at least 30° C., more preferably from 40 to 100° C., and even more preferably from 60 to 90° C. For example, performing heating at normal pressure is also preferred. Bubbling preferably involves blowing a gas into the liquid and using bubbling to promote evaporation. Examples of the desiccant include zeolites.

In step 2, the amount of water removed from the dispersed phase relative to the amount of water prior to removal is preferably at least 80% by mass, more preferably at least 90% by mass, even more preferably at least 95% by mass, and still more preferably 99% by mass or more.

In the dispersant dispersion obtained in step 2, the amount of the solid fraction of the components of the dispersed phase of the water-in-oil emulsion relative to the total mass of the dispersant dispersion is preferably from 1 to 40% by mass, and more preferably from 5 to 30% by mass.

In the dispersant dispersion obtained in step 2, the amount of the dispersant, expressed as the total of the amount of the solid fraction of the dispersed phase components and the amount of the solid fraction of the continuous phased components in the water-in-oil emulsion, is preferably from 20 to 60% by mass, and more preferably from 30 to 50% by mass.

In step 3, the dispersant dispersion and the pigment are mixed and the pigment is dispersed.

In step 3, the dispersant dispersion and the pigment are mixed, but if required, then as described above, a basic polymer and/or a non-aqueous solvent or the like may also be mixed with the dispersant dispersion and the pigment. The basic polymer added in step 3 or the like may be the same as, or different from, the basic polymer contained in the water-in-oil emulsion of step 1. The non-aqueous solvent added in step 3 or the like may be the same as, or different from, the non-aqueous solvent contained in the water-in-oil emulsion of step 1.

There are no particular limitations on the amounts of the various materials used in step 3, and these amounts may be determined appropriately with due consideration of the amount of each of the components in the ink.

In step 3, dispersion of the pigment may be performed while mixing the dispersant dispersion and the pigment, and any basic polymer and/or non-aqueous solvent or the like that may be added as required, or may be performed after mixing the dispersant dispersion and the pigment, and any basic polymer and/or non-aqueous solvent or the like that may be added as required. A beads mill or the like may be used for the dispersion.

The method for producing the oil-based inkjet ink may also include one or more other steps.

The oil-based inkjet ink can be obtained by mixing the dispersant dispersion and the pigment, and any basic polymer and/or non-aqueous solvent or the like that may be added as required, and dispersing the pigment, and then performing one or more other steps if required. In the oil-based inkjet ink, the pigment and the dispersant may, for example, form colored resin particles, and in these colored resin particles, the pigment may be coated with the dispersant.

The average particle size of the colored resin particles in the ink is preferably from 50 to 300 nm, and more preferably from 80 to 200 nm. The average particle size of the colored resin particles in the ink refers to the volume-based average particle size measured by the dynamic scattering method, and can be measured, for example, using a dynamic light scattering particle size distribution analyzer (a nanoparticle analyzer nano Partica SZ-100) manufactured by Horiba, Ltd.

There are no particular limitations on the printing method used with the oil-based inkjet ink, and any of various printing systems including a piezo system, electrostatic system or thermal system may be used. In those cases where an inkjet recording device is used, the ink of an embodiment of the present invention is preferably jetted from the inkjet head based on a digital signal, with the jetted ink droplets being adhered to a recording medium.

The ideal range for the viscosity of the oil-based inkjet ink may vary depending on factors such as the diameter of the nozzles in the inkjet head of the inkjet recording system and the jetting environment and the like, but generally, the viscosity at 23° C. is preferably within a range from 5 to 30 mPa·s, more preferably from 5 to 15 mPa·s, and even more preferably about 10 mPa·s.

In embodiments of the present invention, there are no particular limitations on the recording medium, and examples of media that can be used include printing papers such as plain papers, coated papers and specialty papers, cloth, inorganic sheets, films and OHP sheets, as well as adhesive sheets having one of the above media as a base material and having an adhesive layer provided on the rear surface. Among these, from the viewpoint of ink penetration, a printing paper such as a plain paper or a coated paper can be used particularly favorably.

Here, plain paper describes a normal paper in which an ink receiving layer or film layer or the like has not been formed on the surface of the paper. Examples of plain papers include high-quality papers, medium-quality papers, PPC papers, woody papers and recycled papers. In a plain paper, paper fibers with a thickness of several μm to several tens of μm are formed with a spacing between fibers of several tens to several hundred μm, and therefore the ink can penetrate readily.

In terms of coated papers, coated papers designed for inkjets, such as matte papers, glossy papers and semi-glossy papers, and other so-called coated printing papers can be used favorably. A coated printing paper describes the type of paper that has conventionally been used in relief printing, offset printing, and gravure printing and the like, and is a printing paper in which a coating layer is formed on the surface of a high-quality paper or medium-quality paper using a coating material containing an inorganic pigment such as clay or calcium carbonate and a binder such as starch. Depending on the amount applied of the coating material and the coating method used, coated printing papers are classified into fine coated papers, high-quality lightweight coated papers, medium-quality lightweight coated papers, high-quality coated papers, medium-quality coated papers, art papers, and cast coated papers and the like.

A method for producing a dispersant according to one embodiment of the present invention includes obtaining a water-in-oil emulsion containing a continuous phase that contains a non-aqueous solvent and a basic polymer, and a dispersed phase that contains water, an acidic water-dispersible resin and a low-molecular weight amine compound (hereafter sometimes referred to as "step A"), and removing the water from the water-in-oil emulsion (hereafter sometimes referred to as "step B").

Using this method for producing a dispersant, a dispersant that can be used in the oil-based inkjet ink described above may be obtained. However, the method used for producing the dispersant of the above oil-based inkjet ink is not limited to this method.

Step A is the same as step 1 described in the above example of a method for producing the oil-based inkjet ink described above. In step B, the method used for removing the water and the amount of water removed are the same as the method used for removing the water and the amount of water removed in step 2 described in the above example of a method for producing the oil-based inkjet ink described above.

In step B, the water of the dispersed phase of the water-in-oil emulsion is removed, and as a result, resin particles may be formed from the remaining components of the dispersed phase and the basic polymer of the continuous phase, and a dispersant dispersion may be obtained that contains a dispersant formed with the acidic resin, the low-molecular weight amine compound and the basic polymer in the form of these resin particles. In the dispersant dispersion obtained in step B, an acidic group of the acidic resin and a basic groups of the low-molecular weight amine compound may bond together, and a basic groups of the basic polymer may also bond to an acidic group of the acidic resin.

This method for producing a dispersant may also include one or more other steps such as a step of adding additional basic polymer.

EXAMPLES

The present invention is described below in further detail based on a series of examples. However, the present invention is not limited to the following examples.

In the following examples and comparative examples, unless specifically stated otherwise, common components refer to the same component. Further, unless specifically stated otherwise, "%" indicates "% by mass".

<Ink Materials>

The raw materials used in the inks of the examples and comparative examples are listed below.

Copper phthalocyanine blue: Heliogen Blue D7115F (manufactured by BASF SE)

Disazo yellow: Yellow AP22 (manufactured by Dainichiseika Color & Chemicals Mfg. Co., Ltd.)

Benzimidazolone yellow: Hostaperm Yellow H4 (manufactured by Clariant Japan K.K.)

Azo lake red: Permanent Rubine P-L5b01 (manufactured by Clariant Japan K.K.)

Carbon black: MOGUL L (manufactured by Cabot Specialty Chemicals Inc.)

Urethane-urea resin water dispersion 1: produced using the method described below water dispersion containing an acidic urethane-urea resin and triethanolamine, active component: 30%)

Urethane-urea resin water dispersion 2: produced using the method described below (a water dispersion containing an acidic urethane-urea resin and dimethylethanolamine, active component: 30%)

Urethane-urea resin water dispersion 3: produced using the method described below (a water dispersion containing an acidic urethane-urea resin and triethylamine, active component: 30%)

(Meth)acrylic resin water dispersion 1: produced using the method described below (a water dispersion containing an acidic (meth)acrylic resin and dimethylethanolamine, active component: 30%)

Urethane resin solution 1: produced using the method described below (a solution of an acidic urethane resin, active component: 50%)

Urethane resin water dispersion 1: produced using the method described below (a water dispersion containing an acidic urethane resin and dimethylethanolamine, active component: 30%)

Basic polymer 1: produced using the method described below (a solution of a basic (meth)acrylic-based polymer, active component: 40%, solvent: fatty acid ester-based solvent)

Basic polymer 2: produced using the method described below (a solution of a basic acrylic-based polymer, active component: 40%, solvent: fatty acid ester-based solvent)

Basic polymer 3: Solsperse 13940 (manufactured by The Lubrizol Corporation) (a solution of a basic comb-like polymer, active component: 40%, solvent: petroleum-based solvent)

Basic polymer 4: HYPERMER KD11 (manufactured by Croda Japan K.K.) (a solution of a basic comb-like polymer, active component: 40%, solvent: high-boiling point paraffin oil)

Acidic polymer 1: Solsperse 21000 (manufactured by The Lubrizol Corporation) (active component: 100%)

Fatty acid ester-based solvent 1: isopropyl myristate (manufactured by FUJIFILM Wako Pure Chemical Corporation)

Petroleum-based hydrocarbon solvent 1: Exxsol D130 (manufactured by Exxon Mobil Corporation)

Higher alcohol-based solvent 1: oleyl alcohol (manufactured by FUJIFILM Wako Pure Chemical Corporation)

<Production of Urethane-Urea Resin Water Dispersions 1 to 3>

In a four-neck flask, 767.6 parts by mass of polytetramethylene glycol (manufactured by Mitsubishi Chemical Corporation), 55.5 parts by mass of 2,2-dimethylolbutanoic acid (manufactured by HighChem Co., Ltd.), 23.7 parts by mass of 1,4-butanediol (manufactured by Mitsubishi Chemical Corporation) and 203.2 parts by mass of hexamethylene diisocyanate (manufactured by Tokyo Chemical Industry Co., Ltd.) were reacted in 724.4 parts by mass of methyl ethyl ketone (manufactured by Tokyo Chemical Industry Co., Ltd.) at 80° C. for 6 hours. Subsequently, 21.8 parts by mass of hexanediamine (manufactured by Tokyo Chemical industry Co., Ltd.) was added to the flask. Next, 2,000 parts by mass of 50° C. ion-exchanged water was added to the solution, and triethanolamine (manufactured by Tokyo Chemical Industry Co., Ltd.) was then used to adjust the pH to 8. Subsequently, the methyl ethyl ketone was removed at 50° C. under reduced pressure. Additional ion-exchanged water was then added to adjust the solid fraction to 30% by mass, thus obtaining a water dispersion (active component: 30%) containing an acidic urethane-urea resin and triethanolamine as a low-molecular weight amine compound. This dispersion was designated urethane-urea resin water dispersion 1.

With the exception of using dimethylethanolamine (manufactured by Tokyo Chemical industry Co., Ltd.) instead of triethanolamine, a water dispersion (active component: 30%) containing an acidic urethane-urea resin and dimethylethanolamine as a low-molecular weight amine compound was obtained in the same manner as the production of the urethane-urea resin water dispersion 1. The resulting dispersion was designated urethane-urea resin water dispersion 2.

With the exception of using triethylamine (manufactured by Tokyo Chemical Industry Co., Ltd.) instead of triethanolamine, a water dispersion (active component: 30%) containing an acidic urethane-urea resin and triethylamine as a low-molecular weight amine compound was obtained in the same manner as the production of the urethane-urea resin water dispersion 1. This dispersion was designated urethane-urea resin water dispersion 3.

<Production of (Meth)Acrylic Resin Dispersion 1>

An emulsification monomer composition was produced by adding a monomer mixture A composed of 95 parts by mass of methyl methacrylate (manufactured by Tokyo Chemical Industry Co., Ltd.) and 5 parts by mass of butyl acrylate to an aqueous solution prepared by dissolving 2 parts by mass of EMULGEN 1135S-70 (a nonionic unreactive surfactant manufactured by Kao Corporation) and 1.5 parts by mass of Emulsogen EPA073 (an anionic unreactive surfactant manufactured by Clariant Japan K.K.) in 40 parts by mass of ion-exchanged water. Subsequently, a four-neck flask was charged with 173 parts by mass of ion-exchanged water and 1 part by mass of Emulsogen EPA073, the mixture was stirred to dissolve the surfactant, and the temperature was then raised to 73° C. Next, 5% of the above emulsification monomer composition was added to the flask and stirred, 1.3 parts by mass of a 3% aqueous solution of potassium persulfate (manufactured by FUJIFILM Wako Pure Chemical Corporation) (hereafter sometimes referred to as "3% potassium persulfate") was added, and an initial polymerization was conducted. Subsequently, with the temperature maintained at 80° C., 5.3 parts by mass of 3% potassium persulfate and the remainder of the emulsification monomer composition was added dropwise over a period of 3 hours and 30 minutes to continue the polymerization reaction. Following completion of the dropwise addition, reaction was continued for 60 minutes to complete the first stage polymerization. Next, a monomer mixture B composed of 2.8 parts by mass of methyl methacrylate and 2.4 parts by mass of methacrylic acid (manufactured by FUJIFILM Wako Pure Chemical Corporation) was added at the same time as 0.87 parts by mass of 3% potassium persulfate to initiate a second stage polymerization. Following completion of the dropwise addition, dimethylethanolamine (manufactured by Tokyo Chemical Industry Co., Ltd.) was used to adjust the pH to 8, and reaction aging was then conducted for one hour. The reaction mixture was then cooled to 50° C., stirring was continued for an additional one hour, and ion-exchanged water was added to adjust the solid fraction to 30% by mass, thus obtaining a water dispersion (active component: 30%) containing an acidic (meth)acrylic resin and dimethylethanol amine as a low-molecular weight amine compound. This dispersion was designated (meth) acrylic resin water dispersion 1.

<Production of Urethane Resin Solution 1 and Urethane Resin Water Dispersion 1>

A four-neck flask was charged with 105.1 parts by mass of diethanolamine (manufactured by FUJIFILM Wako Pure Chemical Corporation), and the temperature was raised to 110° C. under a stream of nitrogen gas while the content in the flask was being stirred. Subsequently, 72.1 parts by mass of acrylic acid (manufactured by FUJIFILM Wako Pure Chemical Corporation) was added dropwise to the flask over a period of 30 minutes. The temperature was held at 110° C. for two hours to complete a Michael addition reaction, thus obtaining a liquid diol. A separate four-neck flask was then charged with 35.4 parts by mass of the diol solution obtained above and 15.2 parts by mass of propylene glycol (manufactured by FUJIFILM Wako Pure Chemical Corporation) as another diol component, 0.15 parts by mass of dibutyltin dilaurate (manufactured by Tokyo Fine Chemical Co., Ltd.) was added as a tin catalyst, and the temperature was raised to 78° C. under a stream of nitrogen gas while the content in the flask was being stirred. A mixture of 67.3 parts by mass of hexamethylene diisocyanate (manufactured by Tokyo Chemical industry Co., Ltd.) and 118.1 parts by mass of methyl ethyl ketone (manufactured by Tokyo Chemical Industry Co., Ltd.) was then added dropwise to the flask over a period of 30 minutes. Following the dropwise addition, the mixture was reacted under reflux at a temperature of 78° C. to 80° C. for 24 hours, and the reaction mixture was then cooled to obtain a solution of an acidic urethane resin having a solid fraction of 50% by mass. This solution was designated urethane resin solution 1. The urethane resin solution 1 did not contain a low-molecular weight amine compound.

Eighty parts by mass of ion-exchanged water was added to 100 parts by mass of the above solution of an acidic urethane resin (the urethane resin solution 1), and dimethylethanolamine (manufactured by Tokyo Chemical Industry Co., Ltd.) was then used to adjust the pH to 8. Subsequently, the methyl ethyl ketone was removed at 50° C. under reduced pressure. Additional ion-exchanged water was then added to adjust the solid fraction to 30% by mass, thus obtaining a water dispersion (active component: 30%) containing an acidic urethane resin and dimethylethanol amine as a low-molecular weight amine compound. This dispersion was designated urethane resin water dispersion 1.

<Production of Basic Polymers 1 and 2>

The monomer compositions for polymers A and B are shown in Table 1. The monomers shown in Table 1 were mixed in the proportions shown in Table 1 to prepare the respective monomer mixtures. The blend amount for each monomer shown in Table 1 represents a % by mass value. In a separate preparation, a flask was charged with methyl oleate (manufactured by FUJIFILM Wako Pure Chemical Corporation), and the temperature was raised to 110° C. under a stream of nitrogen and constant stirring. Subsequently, with the temperature maintained at 110° C., Perbutyl O (t-butylperoxy 2-ethylhexanoate, manufactured by NOF Corporation) was added, and the prepared monomer mixture was then added dropwise over a period of three hours. Subsequently, with the temperature maintained at 110° C., additional Perbutyl O was added one hour after, and then two hours after, completion of the dropwise addition. The liquid temperature was then held at 110° C. for a further one hour. This process was used to obtain solutions of the polymer A and the polymer B respectively. The obtained solution of the polymer B was designated basic polymer 2. Diethanolamine (manufactured by FUJIFILM Wako Pure Chemical Corporation) was added to the obtained solution of the polymer A in an amount of one equivalent relative to the glycidyl methacrylate, and the resulting mixture was stirred at 110° C. for 3 hours to obtain a basic polymer 1. In this manner, the basic polymers 1 and 2 (solutions having a solid fraction of 40%) were obtained. In the production of the basic polymers 1 and 2, the amount of methyl oleate was adjusted so as to achieve a solid fraction of 40% in each case.

TABLE 1

| (units: % by mass) | Polymer A | Polymer B (basic polymer 2) |
|---|---|---|
| Behenyl methacrylate | 50 | 50 |
| Lauryl methacrylate | 20 | 20 |
| Acetoacetoxyethyl methacrylate | 15 | 15 |
| Dimethylaminoethyl methacrylate | | 15 |
| Glycidyl methacrylate | 15 | |

The materials shown in Table 1 are as follows.
Behenyl methacrylate: manufactured by NOF Corporation
Acetoacetoxyethyl methacrylate: manufactured by The Nippon Synthetic Chemical Industry Co., Ltd.
Lauryl methacrylate: manufactured by Kao Corporation
Dimethylaminoethyl methacrylate: manufactured by FUJIFILM Wako Pure Chemical Corporation
Glycidyl methacrylate: manufactured by FUJIFILM Wako Pure Chemical Corporation <Production of Inks>

Inks of Examples 1 to 14 and Comparative Examples 1 and 2 were produced in the manner described below.

1. Production of Dispersant-Containing Liquids 1 to 9 and 11.

Using the blend amounts shown for EM1 to EM9 and EM11 in Tables 2 and 3, a non-aqueous solvent, and a basic polymer or an acidic polymer were mixed together to prepare a mixture for a continuous phase. A water dispersion containing an acidic resin and a low-molecular weight amine compound shown for EM1 to EM9 and EM11 in Tables 2 and 3 (one of the urethane-urea resin water dispersions 1 to 3, the (meth)acrylic resin water dispersion 1, or the urethane resin water dispersion 1) was added dropwise as a mixture for a dispersed phase to the mixture for the continuous phase prepared in the manner described above, while the resulting mixture was cooled in an ice bath and subjected to irradiation for 10 minutes using an ultrasonic homogenizer "Ultrasonic Processor VC-750" (manufactured by Sonics & Materials, Inc.), thus obtaining a water-in-oil (W/O) emulsion (each of EM1 to 9 and 11). Using a rotary evaporator RE601 (manufactured by Yamato Scientific Co., Ltd.), 100 g of each of these water-in-oil emulsions (EM1 to 9 and 11) was treated for one hour in a water bath of 80° C. with the pressure reduced to a degree of vacuum of 100 hPa, thereby removing water from the emulsion and obtaining a dispersant dispersion in the form of a resin particle dispersion having a solid fraction of 40%. The water removal ratio was substantially 100% by mass. The dispersant dispersions obtained using EM1 to 9 and 11 respectively and removing water in this manner were designated dispersant dispersions 1 to 9 and 11 (each having a solid fraction of 40%) respectively (hereafter sometimes referred to as dispersants 1 to 9 and 11 respectively).

2. Production of Dispersant-Containing Liquid 10

Using the blend amounts shown for ML10 in Table 3, a non-aqueous solvent and the basic polymer 1 were mixed together. A solution of an acidic resin (the urethane resin solution 1) was added to the mixture in the blend amount shown for ML10 in Table 3, thus obtaining a mixed liquid. This mixed liquid was designated ML10. Using a rotary evaporator RE601 (manufactured by Yamato Scientific Co., Ltd.), methyl ethyl ketone was removed from this ML10 in a water bath of 60° C. with the pressure reduced to a degree of vacuum of 100 hPa, thus obtaining a dispersant-containing liquid 10 (having a solid fraction of 40%) containing no low-molecular weight amine compound (hereafter sometimes referred to as dispersant 10). For ML10, the "amount of water in the water-in-oil emulsion" referred to in Tables 2 and 3 indicates the amount of water in the mixed liquid ML10.

3. Production of Inks

Pigments were mixed with the dispersant-containing liquids and non-aqueous solvents using the blend amounts shown in Tables 4 and 5, and the resulting mixtures were dispersed using a beads mill (Dyno-Mill Multi LAB, manufactured by Shinmaru Enterprises Corporation) to obtain inks of Examples 1 to 14 and Comparative Examples 1 and 2.

In Tables 4 and 5, "Ex" indicates "Example" and "C Ex" indicates "Comparative Example".

The blend amount for each material shown in Tables 2 to 5 represents a parts by mass value. In those cases where the material includes a volatile component, the blend amount for the material shown in Tables 2 to 5 is an amount that includes the volatile component.

<Evaluation Methods>

Evaluations were performed in accordance with the following evaluation methods. The results are shown in Tables 4 and 5.

(1) Aggregates

The ink was introduced into an inkjet printer ORPHIS GD9630 (manufactured by RISO KAGAKU CORPORATION) and circulated through the ink pathway, and the printer was then left to stand in that state for two weeks. Subsequently, 1 ml of the ink was extracted from the ink pathway and inspected under an optical microscope, and an evaluation of aggregates was performed against the following evaluation criteria.
(Evaluation Criteria)
A: aggregates are not observed
B: aggregates are observed
(2) Surface Saturation (Color Developmen) and Strike-Through Each ink was loaded into an inkjet printer ORPHIS GD9630 (manufactured by RISO KAGAKU CORPORATION), and a solid image was printed onto a plain paper "RISO Paper Multi" (manufactured by RISO KAGAKU CORPORATION). The saturation of the surface of the printed item (the surface saturation value) and the image density of the rear surface of the printed item (the rear surface OD value) were measured, and based on the surface saturation value and the rear surface OD value, surface saturation and strike-through were evaluated against the following criteria. The device used for measuring the saturation and the OD value was an X-Rite eXact device manufactured by Videojet X-Rite K.K.
(Cyan Ink Surface Saturation: Evaluation Criteria)
AA: surface saturation of 60 or higher
A: surface saturation of less than 60

(Yellow Ink Surface Saturation: Evaluation Criteria)
AA: surface saturation of 70 or higher
A: surface saturation of less than 70
(Strike-Through: Evaluation Criteria)
AA: rear surface OD value of less than 0.15
A: rear OD surface value of at least 0.15
(3) Rub Fastness A printed item was produced in the same manner as that described for the above evaluation methods for the surface saturation and image strike-through. Subsequently, 24 hours after printing, an area including the solid image portion on the surface having the solid image of the printed item was rubbed 5 times in 5 seconds with a white cotton cloth using a crockmeter (CM-1 manufactured by Atlas Electric Devices Co., Ltd.), and the level of contamination around the image periphery was evaluated against the following criteria.
(Evaluation Criteria)
AA: almost no contamination is visible around the image periphery
A: slight contamination is visible around the image periphery
B: contamination is visible around the image periphery

TABLE 2

| (units: parts by mass) | | | Active component | EM1 | EM2 | EM3 | EM4 | EM5 |
|---|---|---|---|---|---|---|---|---|
| Dispersant | Dispersion containing acidic resin and low-molecular weight amine compound (dispersed phase component) | Urethane-urea resin water dispersion 1 | 30% | 53.3 | | | | |
| | | Urethane-urea resin water dispersion 2 | 30% | | 53.3 | | | |
| | | Urethane-urea resin water dispersion 3 | 30% | | | 53.3 | | |
| | | (Meth)acrylic resin water dispersion 1 | 30% | | | | 53.3 | |
| | | Urethane resin water dispersion 1 | 30% | | | | | 53.3 |
| | Solution of acidic resin (containing no low-molecular weight amine compound) | Urethane resin solution 1 | 50% | | | | | |
| | Basic polymer (continuous phase component) | Basic polymer 1 | 40% | 60.0 | 60.0 | 60.0 | 60.0 | 60.0 |
| | | Basic polymer 2 | 40% | | | | | |
| | | Basic polymer 3 | 40% | | | | | |
| | | Basic polymer 4 | 40% | | | | | |
| | Acidic polymer (continuous phase component) | Acidic polymer 1 | 100% | | | | | |
| Non-aqueous solvent (continuous phase component) | Fatty acid ester-based solvent 1 | | | 24.0 | 24.0 | 24.0 | 24.0 | 24.0 |
| | Petroleum-based hydrocarbon solvent 1 | | | | | | | |
| Total (units: parts by mass) | | | | 137.3 | 137.3 | 137.3 | 137.3 | 137.3 |
| Amount of water in water-in-oil emulsion (units: parts by mass) | | | | 37.3 | 37.3 | 37.3 | 37.3 | 37.3 |
| Following water removal (solid fraction: 40%) | | | | Dispersant 1 | Dispersant 2 | Dispersant 3 | Dispersant 4 | Dispersant 5 |

TABLE 3

| (units: parts by mass) | | | Active component | EM6 | EM7 | EM8 | EM9 | ML10 | EM11 |
|---|---|---|---|---|---|---|---|---|---|
| Dispersant | Dispersion containing acidic resin and low-molecular weight amine compound (dispersed phase component) | Urethane-urea resin water dispersion 1 | 30% | 53.3 | 53.3 | 53.3 | 53.3 | | 53.3 |
| | | Urethane-urea resin water dispersion 2 | 30% | | | | | | |
| | | Urethane-urea resin water dispersion 3 | 30% | | | | | | |
| | | (Meth)acrylic resin water dispersion 1 | 30% | | | | | | |
| | | Urethane resin water dispersion 1 | 30% | | | | | | |
| | Solution of acidic resin (containing no low-molecular weight amine compound) | Urethane resin solution 1 | 50% | | | | | 32.0 | |
| | Basic polymer (continuous phase component) | Basic polymer 1 | 40% | | | | 60.0 | 60.0 | |
| | | Basic polymer 2 | 40% | 60.0 | | | | | |
| | | Basic polymer 3 | 40% | | 60.0 | | | | |
| | | Basic polymer 4 | 40% | | | 60.0 | | | |
| | Acidic polymer (continuous phase component) | Acidic polymer 1 | 100% | | | | | | 18.0 |
| Non-aqueous solvent (continuous phase component) | Fatty acid ester-based solvent 1 | | | 24.0 | 24.0 | 24.0 | | 24.0 | 66.0 |
| | Petroleum-based hydrocarbon solvent 1 | | | | | | 24.0 | | |
| Total (units: parts by mass) | | | | 137.3 | 137.3 | 137.3 | 137.3 | 116.0 | 137.3 |
| Amount of water in water-in-oil emulsion (units: parts by mass) | | | | 37.3 | 37.3 | 37.3 | 37.3 | 16.0 | 37.3 |
| Following water removal (solid fraction: 40%) | | | | Dispersant 6 | Dispersant 7 | Dispersant 8 | Dispersant 9 | Dispersant 10 | Dispersant 11 |

TABLE 4

| (Units: parts by mass) | | Active component | Ex 1 | Ex 2 | Ex 3 | Ex 4 | Ex 5 | Ex 6 | Ex 7 | Ex 8 |
|---|---|---|---|---|---|---|---|---|---|---|
| Pigment | Copper phthalocyanine blue | | 6.0 | 6.0 | 6.0 | 6.0 | 6.0 | 6.0 | 6.0 | 6.0 |
| | Disazo yellow | | | | | | | | | |
| | Benzimidazolone yellow | | | | | | | | | |
| | Azo lake red | | | | | | | | | |
| | Carbon black | | | | | | | | | |
| Dispersant-containing liquid | Dispersant 1 | 40% | 12.5 | | | | | | | |
| | Dispersant 2 | 40% | | 12.5 | | | | | | |
| | Dispersant 3 | 40% | | | 12.5 | | | | | |
| | Dispersant 4 | 40% | | | | 12.5 | | | | |
| | Dispersant 5 | 40% | | | | | 12.5 | | | |
| | Dispersant 6 | 40% | | | | | | 12.5 | | |
| | Dispersant 7 | 40% | | | | | | | 12.5 | |
| | Dispersant 8 | 40% | | | | | | | | 12.5 |
| | Dispersant 9 | 40% | | | | | | | | |
| | Dispersant 10 | 40% | | | | | | | | |
| | Dispersant 11 | 40% | | | | | | | | |

TABLE 4-continued

| (Units: parts by mass) | | Active component | Ex 1 | Ex 2 | Ex 3 | Ex 4 | Ex 5 | Ex 6 | Ex 7 | Ex 8 |
|---|---|---|---|---|---|---|---|---|---|---|
| Non-aqueous solvent | Fatty acid ester-based solvent 1 | | 40.8 | 40.8 | 40.8 | 40.8 | 40.8 | 40.8 | 40.8 | 40.8 |
| | Petroleum-based hydrocarbon solvent 1 | | 40.7 | 40.7 | 40.7 | 40.7 | 40.7 | 40.7 | 40.7 | 40.7 |
| | Higher alcohol-based solvent 1 | | | | | | | | | |
| Total (parts by mass) | | | 100.0 | 100.0 | 100.0 | 100.0 | 100.0 | 100.0 | 100.0 | 100.0 |
| Evaluations | Aggregates | | A | A | A | A | A | A | A | A |
| | Cyan ink surface saturation | | AA | AA | AA | AA | AA | AA | A | A |
| | Yellow ink surface saturation | | — | — | — | — | — | — | — | — |
| | Strike-through | | AA | AA | AA | AA | AA | AA | A | A |
| | Rub fastness | | AA | AA | AA | A | A | AA | AA | AA |

TABLE 5

| (Units: parts by mass) | | Active component | Ex 9 | Ex 10 | Ex 11 | Ex 12 | Ex 13 | Ex 14 | C Ex 1 | C Ex 2 |
|---|---|---|---|---|---|---|---|---|---|---|
| Pigment | Copper phthalocyanine blue | | 6.0 | 6.0 | | | | | 6.0 | 6.0 |
| | Disazo yellow | | | | 6.0 | | | | | |
| | Benzimidazolone yellow | | | | | 6.0 | | | | |
| | Azo lake red | | | | | | 6.0 | | | |
| | Carbon black | | | | | | | 10.0 | | |
| Dispersant-containing liquid | Dispersant 1 | 40% | 12.5 | | 12.5 | 12.5 | 12.5 | 12.5 | | |
| | Dispersant 2 | 40% | | | | | | | | |
| | Dispersant 3 | 40% | | | | | | | | |
| | Dispersant 4 | 40% | | | | | | | | |
| | Dispersant 5 | 40% | | | | | | | | |
| | Dispersant 6 | 40% | | | | | | | | |
| | Dispersant 7 | 40% | | | | | | | | |
| | Dispersant 8 | 40% | | | | | | | | |
| | Dispersant 9 | 40% | | 12.5 | | | | | | |
| | Dispersant 10 | 40% | | | | | | | 12.5 | |
| | Dispersant 11 | 40% | | | | | | | | 12.5 |
| Non-aqueous solvent | Fatty acid ester-based solvent 1 | | 71.5 | | 40.8 | 40.8 | 40.8 | 38.8 | 40.8 | 40.8 |
| | Petroleum-based hydrocarbon solvent 1 | | | 71.5 | 40.7 | 40.7 | 40.7 | 38.7 | 40.7 | 40.7 |
| | Higher alcohol-based solvent 1 | | 10.0 | 10.0 | | | | | | |
| Total (parts by mass) | | | 100.0 | 100.0 | 100.0 | 100.0 | 100.0 | 100.0 | 100.0 | 100.0 |
| Evaluations | Aggregates | | A | A | A | A | A | A | B | B |
| | Cyan ink surface saturation | | AA | AA | — | — | — | — | A | A |
| | Yellow ink surface saturation | | — | — | AA | A | — | — | — | — |
| | Strike-through | | AA | AA | AA | AA | — | — | A | A |
| | Rub fastness | | AA | AA | AA | AA | AA | AA | A | B |

As shown in the tables, the ink of each Example exhibited no formation of aggregates in the aggregates evaluation. In contrast, in Comparative Example 1 which used the dispersant 10 in which a low-molecular weight amine compound was not used, and Comparative Example 2 which the dispersant 11 in which a basic polymer was not used, aggregates formed in the aggregates evaluation in each case.

In Examples 1 to 3 and 6 to 14, which used one of the dispersants 1 to 3 and 6 to 9 that were produced using an acidic urethane-urea resin as the acidic resin, the rub fastness improved.

Among Examples 1 to 10 which each used a cyan ink, in Examples 1 to 6, 9 and 10, which each used one of the dispersants 1 to 6 and 9 formed with a basic polymer having a basic group, a β-dicarbonyl group and an alkyl group, the surface saturation (color development) improved and strike-through was further reduced.

Embodiments of the present invention includes those listed below. However, the present invention is not limited to the embodiments listed below.

<1> An oil-based inkjet ink comprising:
a pigment,
a dispersant formed with an acidic resin, a low-molecular weight amine compound and a basic polymer, and
a non-aqueous solvent.

<2> The oil-based inkjet ink according to <1>, wherein the low-molecular weight amine compound comprises an alkanolamine.

<3> The oil-based inkjet ink according to <1> or <2>, wherein the basic polymer comprises a basic polymer having a basic group, a β-dicarbonyl group and an alkyl group.

<4> The oil-based inkjet ink according to any one of <1> to <3>, wherein the acidic resin comprises at least one selected from the group consisting of an acidic (meth)acrylic resin and an acidic urethane resin.

<5> The oil-based inkjet ink according to <4>, wherein the acidic resin comprises an acidic urethane-urea resin.

<6> A method for producing an oil-based inkjet ink, the method comprising:

obtaining a water-in-oil emulsion containing a continuous phase that comprises a non-aqueous solvent and a basic polymer, and a dispersed phase that comprises water, an acidic water-dispersible resin and a low-molecular weight amine compound;

removing water from the water-in-oil emulsion to obtain a dispersant dispersion; and mixing the dispersant dispersion and a pigment, and dispersing the pigment.

<7> The method for producing an oil-based inkjet ink according to <6>, wherein the low-molecular weight amine compound comprises an alkanolamine.

<8> The method for producing an oil-based inkjet ink according to <6> or <7>, wherein the basic polymer comprises a basic polymer having a basic group, a β-dicarbonyl group and an alkyl group.

<9> The method for producing an oil-based inkjet ink according to any one of <6> to <8>, wherein the acidic water-dispersible resin comprises at least one selected from the group consisting of an acidic water-dispersible (meth)acrylic resin and an acidic water-dispersible urethane resin.

<10> The method for producing an oil-based inkjet ink according to <9>, wherein the acidic water-dispersible resin comprises an acidic water-dispersible urethane-urea resin.

<11> A method for producing a dispersant, the method comprising:

obtaining a water-in-oil emulsion containing a continuous phase that comprises a non-aqueous solvent and a basic polymer, and a dispersed phase that comprises water, an acidic water-dispersible resin and a low-molecular weight amine compound; and removing water from the water-in-oil emulsion.

<12> The method for producing a dispersant according to <11>, wherein the low-molecular weight amine compound comprises an alkanolamine.

<13> The method for producing a dispersant according to <11> or <12>, wherein the basic polymer comprises a basic polymer having a basic group, a β-dicarbonyl group and an alkyl group.

<14> The method for producing a dispersant according to any one of <11> to <13>, wherein the acidic water-dispersible resin comprises at least one selected from the group consisting of an acidic water-dispersible (meth)acrylic resin and an acidic water-dispersible urethane resin.

<15> The method for producing a dispersant according to <14>, wherein the acidic water-dispersible resin comprises an acidic water-dispersible urethane-urea resin.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An oil-based inkjet ink comprising:

a pigment, a dispersant that is a reaction product of reactants comprising an acidic resin, a low-molecular weight amine compound having a molecular weight of not more than 1000 and a basic polymer, and a non-aqueous solvent, wherein the acidic resin comprises an acidic urethane-urea resin.

2. The oil-based inkjet ink according to claim 1, wherein the low-molecular weight amine compound comprises an alkanolamine.

3. The oil-based inkjet ink according to claim 1, wherein the basic polymer comprises a basic polymer having a basic group, a β-dicarbonyl group and an alkyl group.

4. The oil-based inkjet ink according to claim 1, wherein an amount of water in the ink, relative to the total mass of the ink, is not more than 0.5% by mass.

5. The oil-based inkjet ink according to claim 1, wherein an amount of water in the ink, relative to the total mass of the ink, is not more than 0.1% by mass.

6. The oil-based inkjet ink according to claim 1, wherein an amount of water in the ink, relative to the total mass of the ink, is not more than 1% by mass.

7. A method for producing the oil-based inkjet ink according to claim 1, the method comprising:

obtaining a water-in-oil emulsion containing a continuous phase that comprises a non-aqueous solvent and a basic polymer, and a dispersed phase that comprises water, an acidic water-dispersible resin and a low-molecular weight amine compound having a molecular weight of not more than 1000;

removing water from the water-in-oil emulsion to obtain a dispersant dispersion; and mixing the dispersant dispersion and a pigment, and dispersing the pigment, wherein the acidic water-dispersible resin comprises an acidic water-dispersible urethane-urea resin.

8. The method for producing an oil-based inkjet ink according to claim 7, wherein the low-molecular weight amine compound comprises an alkanolamine.

9. The method for producing an oil-based inkjet ink according to claim 7, wherein the basic polymer comprises a basic polymer having a basic group, a β-dicarbonyl group and an alkyl group.

10. The method according to claim 7, wherein an amount of water in the ink, relative to the total mass of the ink, is not more than 1% by mass.

* * * * *